United States Patent [19]
Heerens et al.

[11] 4,347,478
[45] Aug. 31, 1982

[54] CAPACITIVE GAUGE

[76] Inventors: Willem C. Heerens, Arnoldsonstraat 23, 2286 AG Rijswijk, Netherlands; Gerrit H. Peerbolte, Lisztstraat 82, 2625 BL Delft, Netherlands

[21] Appl. No.: 166,627

[22] Filed: Jul. 7, 1980

[30] Foreign Application Priority Data

Jul. 17, 1979 [NL] Netherlands ............... 7905562

[51] Int. Cl.$^3$ ............................................. G01R 27/26
[52] U.S. Cl. .................................. 324/61 R; 324/61 P
[58] Field of Search ............................. 324/61 R, 61 P

[56] References Cited

U.S. PATENT DOCUMENTS

| | | | |
|---|---|---|---|
| 3,084,558 | 4/1963 | Wilcox et al. | 324/61 R X |
| 3,119,266 | 1/1964 | Atkinson | 324/61 P |
| 3,515,987 | 6/1970 | Zurbrick et al. | 324/61 R |
| 3,739,265 | 6/1973 | Skildum | 324/61 R |
| 3,805,150 | 4/1974 | Abbe | 324/61 R |
| 3,812,424 | 5/1974 | Abbe | 324/61 R |
| 4,025,846 | 5/1977 | Franz et al. | 324/61 P |
| 4,092,579 | 5/1978 | Weit | 324/61 R X |

Primary Examiner—Stanley T. Krawczewicz
Attorney, Agent, or Firm—Ladas & Parry

[57] ABSTRACT

Multiple terminal capacitor consisting of two opposite electrode plates, at least one thereof being sub-divided into a plurality of sub-electrodes separated from each other by small gaps, said sub-electrodes each forming with an area of the opposite electrode plate an individual sub-capacitor of the plate-capacitor or cross-capacitor type, said sub-capacitors being connected to circuitry such that any individual sub-electrode of a sub-divided electrode plate together with its related electrode area of the opposite electrode plate constitutes with the surrounding sub-electrodes and their related opposite electrode areas a sub-capacitor system of the Kelvin Guard-ring capacitor type, and such that the cooperation of at least two of the sub-capacitor space systems allows the measurement of any deviation in the plan-parallelity between two surfaces or in the angular coincidence with an accuracy of $1:10^6$ or better.

21 Claims, 34 Drawing Figures type G

Plane view

Cross section A-A

CAPACITIVE GAUGE

The present invention relates to a capacitive gauge, comprising at least one capacitor to be connected in a bridge circuit, said capacitor having at least one of its electrode supports coated with an electrode overlay such that a system of gap-separated subelectrodes if formed, of which at least one functions as guard element and at least one functions as capacitor element, if activated, said system being electro-statically shielded, if any, by a sleeve surrounding the electrode supports. A gauge of this type is known from French patent specification No. 1.599.174.

The gauge according to the invention has for its object to measure variations in capacitance with great accuracy, such as $1:10^6$ or better. In this way it is possible to measure a deviation in the plan-parallelity (slanting position) with great precision, whereas at the same time means are provided to reduce or eliminate this slanted position such that the precision obtained therewith corresponds with the last decimal or highest precision of the value, with which previously the slanted position was measured. Thereby it is possible to reach a high degree of plan-parallelity between two planes.

In a similar manner deviations in the angular alignment (rotation) can be measured very precisely and be eliminated to a high degree of accuracy.

A gauge with such a sensitivity was developed for the first time by Lord Kelvin, be it in a very primitive form.

In the original design of this capacitor the principle of an electrode divided into sub-electrodes was already used, where besides the number of sub-electrodes remained restricted to two, namely a circular inner electrode being, coplanar therewith, surrounded by a ring-shaped electrode of large extensiveness, called the guard-ring. Together with the second plate electrode, opposite the first one and being also of large extensiveness, a three terminal capacitor is formed, with which accurate electrical measurements can be done, such as deviations of the plan-parallelity between surfaces which are almost completely parallel. The presence of the guard ring eliminates fringe effects to a large extent. In this way the gauge thus improved comes close to the ideal capacitor. After the first Kelvin guard ring capacitor a further improvement of this Kelvin capacitor was designed, as disclosed in an Article in J. Appl. Physics 46, pages 2486/90, 1975.

The accuracy of the capacitances achieved by this gauge is about $1^0/_{00}$ to $0.1^0/_{00}$.

For the calculation of capacitance the formula for the ideal plate capacitor is used $$C_e = \frac{\pi \epsilon_0 \epsilon_r R^2_e}{d_0}, \qquad (1)$$

where $R_e$ is the radius of the innermost electrode to be increased with the gap width s between inner electrode and the guardring, $d_0$ is the distance between the two plates and $\epsilon_0 \epsilon_r$ is the permittivity of the medium enclosed between the two capacitor plates.

The improvement, given by this article, concerns the geometry of the fringe. Namely the capacitive system here is placed within a sleeve constituting a conducting surface or being provided with a conducting surface. This conducting surface can be continuous or discontinuous, but serves in both cases (either as a closed or perforated surface) as an electrostatic shield. This sleeve can be connected to the guardring and freely surround the second electrode, as well as it can be connected to the second electrode and freely surround the guardring of the first electrode. Doing this the accuracy of the measured capacitors increases or in other words the inaccuracy decreases. A higher accuracy cannot be achieved because the system if afflicted with some systematic errors, which, though they are small, are going to play a more and more important role in the attempts to achieve higher accuracy. The article describes on page 2488 some sources of these systematic deviations. As such deviations can be called the facts that (i) the gap s between the island-electrode and the guardring cannot be measured accurately enough;

(ii) there is some incertainty in the measured dimension $R_e$ of the island-electrode;

(iii) the same is valid for $R_0$, because of the two possibilities of connecting the sleeve with either the guardring or the second electrode, this $R_O$, being the outer radius of the second electrode, is in the first case surrounded by a gap, in the second case surrounded by the sleeve, due to this it has different values in both cases;

(iv) the sub-electrodes of the first electrode carrier do not have to be in planparallel position with the second electrode carrier or support, so there might be some tilting or slanting between the two carriers or supports.

The invention gives particular attention to the gaps that occur in this system. Before Applicants, there has been used first order corrections for gap influences, using $R_e$ in formula (1). From the litterature there are known more or less useful empiric correction formulas for further elimination of gap influences. Investigations worked out by the Applicants show that the electrode configuration with intervening gap s can be replaced by an ideal gapless electrode configuration with an effective radius $R_{eff}$, provided that the right conditions are fulfilled, further reference to this subject will be made later on.

Based on this fact capacitance can be measured more accurate, besides it has given the Applicants the recognition, that the electrode surface can be divided into any number of sub-electrodes separated by gaps, this because of the fact that investigations have shown, that the influence of the gaps can be eliminated by using such correction terms, that the width of the gaps can be neglected.

Therefore the recognition underlying the invention, is that this accuracy can be improved by a number of specific measures, including a further division of the ring electrodes into more sub-electrodes, and by the fact that each actively operating sub-electrode is surrounded from all sides by sub-electrodes acting as guard element. A capacitor, of which at least one of the electrodes satisfies these conditions, is able to measure very precisely the capacitance formed between active sub-electrode and opposite electrode and to calculate therefrom the distance. However in this way it is not possible without more ado to get informed about a slanting position, if any, of the measuring faces. In its most simple form such a "distance-meter" could be realised by dividing a ring-electrode into two ringhalves by means of an interrupted radial gap and by activating one of these ringhalves, whereas the central portion or island electrode and the other ringhalf functions as guard element.

A capacitor provided with an electrode being divided into sub-electrodes in this manner, and having an active sub-electrode surrounded by guard elements, happens to be known from said French patent specification No. 1.599.174, in which the electrically active electrodes are arranged as immobile as possible with respect to each other and the capacitance varying element is constituted by a rotating semi-circular shield being connected to earth.

The same principle of a rotating semi-circular shield is also applied in the capacitive gauge described in IEEE Transactions on Instrumentation and Measurement, volume IM-23, nr. 4, December 1974, however not for a plate capacitor, as in the French patent specification, but for a cross-capacitor.

The gauge concerned is an assembly of mutually mechanically coupled toroidal or rod-shaped electrodes, and the electrically active electrodes with their adjacent guard electrodes do not constitute an integral unit, and efforts have been made to mount this unit as immobile as possible, and finally the element provoking variations in capacitance, is a semi-circular shield or plate connected to earth, which plate is rotated or slid.

Angular displacements of the described circular form (CIRCAP) between semi-circular shield and the electrode-configuration produce composite first-order errors in the planned angle-measurement.

In spite of the apparent resemblance these citations do not disclose the recognition that on application of a sub-electrode guarded from all sides, the capacitance of the capacitor formed from this sub-electrode and the distance between the plates to be derived therefrom, could be determined more exactly than could be done with the Kelvin guardring capacitor.

This recognition does underly the present invention and has made that, whilst building on the principle of the invention, deviations of the plan-parallelity (slanting position) and of the angular coincidence could be measured and eliminated with great precision.

The measures proposed by the invention are in first instance such that a sub-electrode functioning, if activated, as capacitor element, cooperates with at least another similar simultaneously activatable sub-electrode, which sub-electrodes even if they are in a geometrical respect, if any, separated by at least a gap or similar means, yet are surrounded from all sides by sub-electrodes functioning as guard elements.

Under "cooperation" is in this connection to be understood not the "direct" cooperation with any surface area of the other electrode support to form a plate capacitor or cross-capacitor, but an "indirect" cooperation due to the fact that both sub-electrodes on the same electrode-support are activated simultaneously or one after the other and are destined to yield capacitive information (such as slanting position) measured over the connecting line of these sub-electrodes with respect to the other electrode support. This connecting line can represent in a certain coordinate system f.i. the X-coordinate.

Under the expression "are separated by at least a gap or similar means" is to be understood that a sub-electrode:

1. can be surrounded by sub-electrodes acting as guard elements;
2. or surrounded partly by sub-electrodes acting as guard elements and for the remaining part by gaps;
3. or surrounded by gaps, so that on the other side of the gap(s) are also provided activatable sub-electrodes.

The conformity between the first and third cases is that in the third case the sub-electrodes, apart from the gaps, are adjoining each other; and that in the first case they are separated from each other by guard elements. All this is true for the geometrical aspect of the sub-electrodes concerned.

Under "active state" is to be understood the state of a capacitor formed by opposite sub-electrodes when it is included into a measuring circuit. In the active state it is possible, by means of a bridge circuit, to make that activatable sub-electrodes which adjoin each other in geometrical aspect, yet are surrounded in the active state one by one by guard elements. In this way the following increase in preference is obtained, viz. in the first place that each activatable sub-electrode is surrounded, from all sides, by guard-elements; in the second and third place that activatable sub-electrodes adjoining each other in a geometrical respect wholly or partly only separated by gaps, are connected to earth through separate power sources. The immediate adjoining of the sub-electrodes leads to a more compact arrangement, of importance for "chips" where it should be prevented that space gets lost unnecessarily.

Due to the fact that two sub-electrodes are simultaneously active it is possible to measure the capacitance variation for example in the X-direction, which is a standard for the slanting position of the capacitor plate concerned in the X-direction. If one takes the ratio of the capacitances which both form sub-electrodes with the opposite (sub)electrodes, one will find a number deviating from 1. By tilting the capacitor plate around a line perpendicular to the X-axis (so about the Y-axis), the slanting-state can be eliminated. When one looks at the French patent in respect of these possibilities, it appears that this patent experiences these phenomena, such as slanting position, as inconvenient, annoying, and unpredictable, which may demonstrate clearly that the recognition underlying the present invention, has been lacking completely in said French patent.

In the known gauge the electrode support is rotation-symmetrically constructed. The inventive idea, however, can without more ado be applied on electrode support in the form of an ellips, a square of rectangle, which are preferably traversed by a pattern of intersecting gaps, viz. a combination of the following gap-patterns: concentric circles, lines starting from one common point, a spiral line, parallel lines, etc. These patterns include rotation symmetrical gap-patterns such as a sub-electrode matrix on polar coordinates, or symmetric gap-patterns such as a sub-electrode matrix on elliptical coordinates, or a non-symmetrical gap-pattern such as an electrode matrix on straight or on slanted coordinates. Therefore in a particular embodiment of the invention to obtain—in an electrode support embodiment departing from the rotation-symmetrical shape—simultaneously activatable sub-electrodes separated by sub-electrodes functioning as guard-element, a gap-pattern is provided in the electrode overlay according to slanting or rectangular coordinates. The finer the division of the sub-electrodes on the electrode-support is, that means how denser the gap-lines are provided, the more precise the local distance to the second electrode support in each "spot" (area) of the electrode-support can be determined. For a rotation-symmetrical structure, being known per se from the French patent, where the electrode overlay is divided by a number of concentric gaps into a number of sub-electrodes, this is realized by the fact that in order to obtain simultaneously activatable sub-electrodes separated by sub-electrodes functioning as guard-elements, at least one radial gap, whether or not interrupted, is provided in the electrode overlay.

Once the slanting position in one direction (for example the X-direction) has been eliminated, one will also wish to measure and/or eliminate the slanting position in another coordinate direction. In the latter case the capacitor plates concerned will finally be parallel to each other in an almost ideal manner. To this end according to the invention a sub-electrode functioning as activatable capacitor element cooperates with another sub-electrode lying one moment in a first coordinate direction, and the next moment in another coordinate direction. In principle there are required three sub-electrodes, of which the "middle one" forms a cooperating pair both with the one and with the other sub-electrode.

In some cases it can be desirable that both pairs of "cooperating" sub-electrodes are completely separated functionally. In such a case it is provided for that in any of two different coordinate directions, two separated, activatable sub-electrodes cooperate together as a pair. This measure is applicable both in a non-rotation symmetrical and an indeed rotation symmetrical embodiment of the electrode-support. Of this last type the next embodiment is to be preferred owing to its simplicity. Said embodiment has the characteristic that two interrupted radial gaps are provided in the electrode overlay such that four sub-electrodes are formed being offset over 90°.

The electrode support provided with a sub-electrode configuration according to the invention can, in order to form a capacitor, be combined in principle with an electrode support, which is coated with an electrode overlay without gaps, thus which is continuous. The large surface of the counter electrode guarantees that no incalculable contributions in capacitance are provoked, which as parasitic capacitances become appreciable. But if to the counter electrode the same is done as to the first electrode, thus such that the second electrode support is likewise divided into sub-electrodes by means of a pattern of intersecting gaps in a analogous manner as has happened with the first electrode support, simultaneous measurements can be executed according to different coordinate directions without the excited signals influencing each other.

Owing to these divisions all kinds of electrode configurations can be made in an electrode carrier in combination with a second electrode carrier, which is placed opposite towards the first one and which is continuously covered or is subdivided.

In its simple form the gauge according to the invention therefore consists of an island electrode, a surrounding ring electrode divided in two segments, and an outside electrode, opposite to a second continuous electrode surface (type A), or instead of one in two segments sub-divided ring electrode two concentric ring electrodes (type B). So each of this types has one ring segment or one ring electrode more in regard to the gauge known. Just only this little difference gives the gauge remarkable attractive qualities. In particular the combination of both types results in a gauge that differs from the gauge known, by extra gaps consisting of one concentric gap and four radial gaps, to be pushed on 90°, in the ring electrode bording the island electrode, while the other ring electrode serves as a guardring (type C), which could be called the ideal plate capacitor.

In principle it is not necessary for the second electrode-support to have exactly the same sub-electrode configuration as the first electrode support, so that it may occur that the gap pattern of the second electrode support exhibits in plan view the mirror image of that of the first electrode support.

Besides the mirror image, the gap pattern on the other electrode carrier can be nearly identical to the first one, for example if there is a hole in it somewhwere or if the surface is partly identical (better the mirror image) partly not, or such combinations.

However it is advantageous when the second electrode support as regards its sub-electrode configuration is identical to the first electrode support.

Especially favourable for corrections of sidely displacements or centering errors is a gauge with the feature that for measurements and for elimination of sidely displacements (translations) the gap patterns are made according to oblique or rectangular coordinates (type D), which is the ideal gauge for this task.

It is possible to orientate the gaps into the two electrode-supports both with respect to slanted or rectangular coordinates and with respect to a polar coordinate system.

In all this cases electrode areas in one carrier can be combined crosswise with electrode areas in the other carriers, which means areas that are situated in projection on both sides of the same part of a gap. Doing this there results a gauge, with the feature that a ring electrode in one electrode carrier and a ring electrode in the other electrode carrier are switched according to a cross capacitance (type E).

This gauge can be improved by division into segments of one of the concerning ring electrodes (type F).

In a special form the gauge has the characteristic that both of the ring electrodes that contribute to the cross capacitance have been divided in equal segments (for example 90°) by radial gaps, which are switched in pairs as diametrically orientated cross capacitances for measurements and/or elimination of rotations (type G).

Now will be given a survey of systematic deviations, of which some are earlier and some are not yet earlier listed, that can be suppressed with the gauge types mentioned before:

1. The effective radius $R_{eff}$:

As is written before the invention is based on the view that the electrode configuration with intersecting gap s can be replaced by an ideal gapless electrode configuration with an effective radius $R_{eff}$. From investigations on that subject it has been proved that for thin evaporated electrodes the correction $\Delta R_{eff}$ between the mean radius $R_e$ of formula (1) and the effective radius $R_{eff}$ is given by $$\Delta R_{eff}/R_e = -0.2348(s/R_e)^2 + 0.0076 s^2/(R_e d_0) \quad (2)$$

The formulas are valid for $s/R_e \leq 0.08$ and for $4.6 \leq R_e/d_0 \leq 140$, with an accuracy of the coefficients of about 5%. For the investigations two electrode carriers have been used on which aluminum has been evaporated, and in which concentric gaps have been provided. From capacitance measurements, using capacitors built up by different combinations of ring shaped electrodes of both electrode carriers, and with all other electrodes serving as guardring, it has been proved that both the plate capacitor with a wide gap on the outside, the plate capacitor with a wide gap on the inside, as well as the mutual comparison of the two cross capacitances, that can be achieved by crosswise switching of electrodes bordering the concerned gaps, lead to identical results for the radius correction $\Delta R_{eff}$. The definition of $R_{eff}$ earlier given, namely that this radius is similar to the geometric centre radius of the gap, is in fact only valid with high accuracy for infinitely small gaps and for straight gaps (for which $R = \infty$).

For wider gaps (necessary for use with high frequencies, high potential differences between bordering electrodes and for curved gaps, so with finite values for R) this definition is valid only in approximation. In such a case $R_{eff}$ has to be determined in advance by measurements of ideal cross capacitances and ideal plate capacitances in a capacitance measurement bridge, from which $R_{eff}$ can be calculated. If one works with a simple gauge (for example type A or B), one does not have the features for these ideal capacitance measurements and one has to get the value for $R_{eff}$ from the factory in order to be able to use the ideal capacitor formulas. These formulas are for the ideal plate capacitor $C_{plid}$ and respectively for the ideal cross capacitor $C_{krid}$ given by:

$$C_{plid} = \frac{\epsilon_0 \epsilon_r \pi R_{eff}^2}{d_0} \quad (3.a)$$

$$C_{krid} = \epsilon_0 \epsilon_r 2 R_{eff} \ln 2. \quad (3.b)$$

Formula (3.b) is valid for large values of $R_{eff}/d_0$. For smaller ratios of $R_{eff}/d_0$ there has been developed a formula with higher complexity by the Applicants.

2. The tilting or deviation of planparallel position.

This effect can be checked and adjusted with gauges of the types A and B. With gauge A the direction of tilting is detectable and there is a linear relation, but the accuracy is less than that of a guage of the type B, which is quadratic and with which the size but not the direction can be detected. The accuracy lies between 1 and 0.1 ppm.

3. The distance measurement.

This is not a systematic error, but doing this no extreme accuracies have been achieved in the past and in recent times. If however tilting has been eliminated and if $R_{eff}$ is known, and furthermore the condition $w \geq 5d_0$ is satisfied, where w = width of the outer guardring, the distance between electrode carriers can be measured with extreme high accuracies (1 − 0.1 ppm accuracy).

With the Kelvin gauge one cannot detect directly this tilting, like with the invented gauge, this tilting can only be detected by varying the position of one of the electrode carries, so varying the distance, this in order to achieve more measurements. The distances in that case have to be measured with a screw-micrometer or any other accurate instrument.

Other errors that can occur in the system are:

4. Sideway shifting or translations.
5. Rotations.

These deviations can only be measured with a gauge of the type D to G, so using cross capacitors, for what purpose also the second electrode carrier has to be divided into sub-electrodes. These gauges with cross capacitors are exclusively useful for measurement and elimination of the deviations 4. and 5. and not for the previous mentioned errors, that only can be detected with the earlier mentioned gauges using plate capacitors. The gauge of the type D is in particular useful for the measurements and elimination of sideway shifting, largely thanks to its gap pattern on rectangular coordinates, while the gauge of the type G is exclusively useful for measurement and elimination of rotations, due to its gap pattern of concentric gaps crossed by radial gaps.

The Kelvin gauge, which is similar to the types A to C of the plate capacitor type, is not capable of measuring the last two mentioned deviations.

The gauge according to the invention is universal. It can be switched both as a differential plate capacitor as well as a differential cross capacitor—even in its applications—because of the fact that the gauge according to the invention, in regard to the gauge known, has much more sub-electrodes in function or more electrodes can be switched on, each of them via and individual, or in common via a multi core shielded cable connected with an extensive cummutator, in order to change connections outside the original gauge letting the commutator form sometimes cross capacitors, sometimes plate capacitors. Doing this, all kind of combinations can be made and all that is due to the fact that by subdivision a great number of sub-electrodes has been formed. Among them also those combinations, with which in one single gauge certain electrode areas are switched as capacitor combinations (plate- and/or cross capacitors) and at the same time other combinations can be measured by plural set up of measurement bridges with common central ground or earth terminal. The first combination is measured continuously in the first bridge at a certain frequency, the other combinations are measured continuously in other bridges with other individual frequencies, in such a way that measurements do not interfere each other. Doing this one can eliminate the relative permittivity $\epsilon_r$ in plate- and cross capacitance ratios, so even in the presence of an inferior dielectric medium between the two electrode carriers one can do measurements without great difficulties. Also measurements can be carried out in which sideway expansion coefficients of electrode carriers have been eliminated and only the measurements of the expansion coefficient of the electrode distance remains.

A special application of the invented gauge is that of a pressure gauge, like in the gauge known, the second electrode carrier is mechanically connected with the shielding support. However the gauge according to the invention differs from the gauge known, because of the fact that, in the applications for load measurements, the second electrode carrier functionates as a flexible electrode, mechanically connected with the support, but electrically isolated from this shielding support.

Preferably the electrode configuration is double sided, in regard to the flexible electrode. The advantage of doing this is a greater linear gain of the gauge at higher loads.

The flexural rigidity in the flexible electrode carrier does not have to be homogeneous all over the surface. In a preferable application the flexible area is restricted to a ring-shaped area. In a closer elaboration of this principle the centre of the flexible electrode is equipped with a rotation symmetrical mass. An application of this is a seismometer, as well as a weighing-apparatus or a rainfall gauge.

Other applications are a velocity gauge, a depth gauge, a height gauge, a density gauge.

Vibration effects in the audio frequent region, but especially with low frequencies can be measured quite well with the gauge.

An other application of the gauge according to the invention is a thickness monitor.

Surrounding the interelectrode space with a flexible non-permeable material makes the gauge in several set ups useful for applications in environments, where pollution of dust and corrosion of agressive chemicals cause serious problems.

The invention will be explained in more detail, using the figures of enclosed drawings, in which examples of applications are given.

FIG. 1 shows the configuration of the electrodes of the original Kelvin-guardring capacitor;

FIG. 2 gives a schematic construction of that electrode system;

Figure 9:
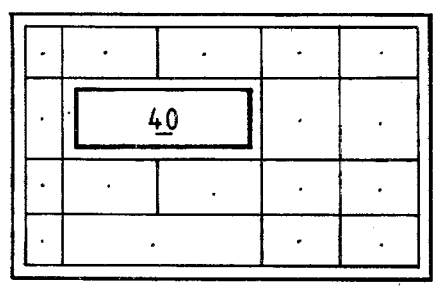
Figure 9A:
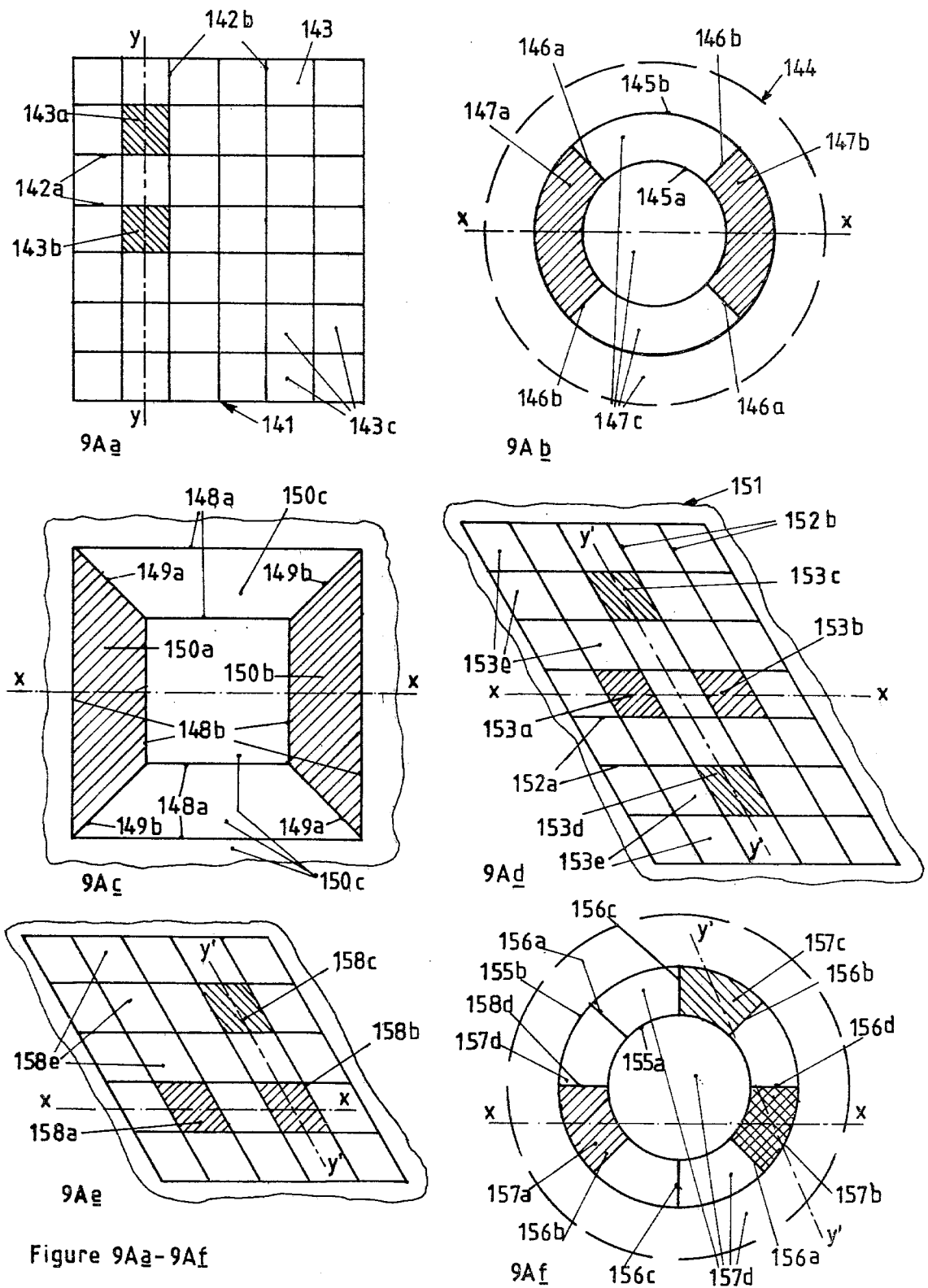
Figure 9A:
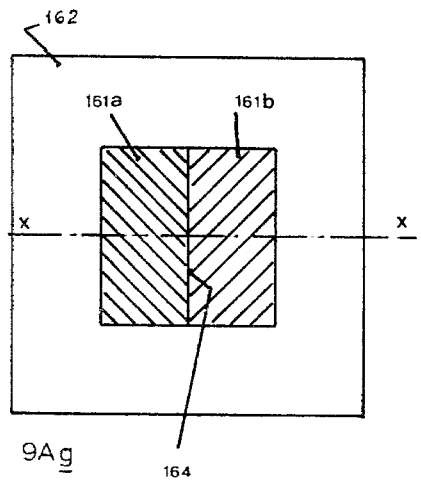
Figure 9A:
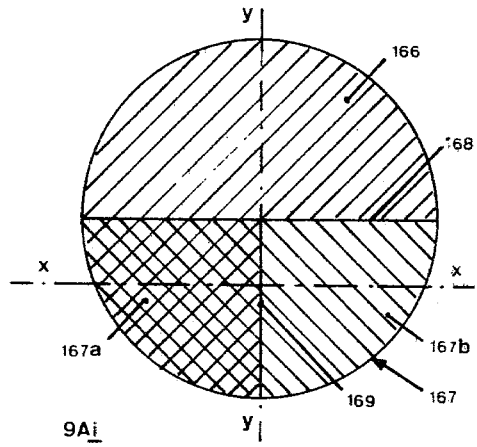
Figure 9A:
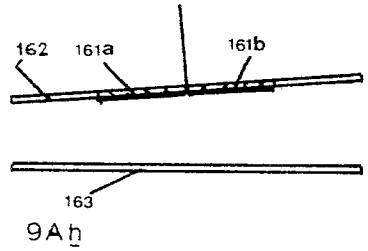
Figure 9A:
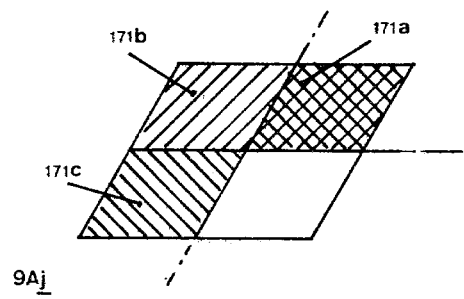
Figure 9A:
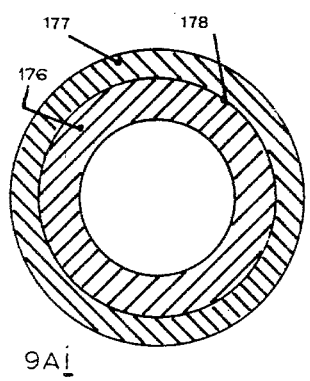
Figure 9A:
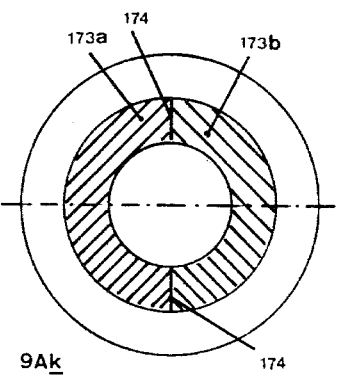
Figure 9A:
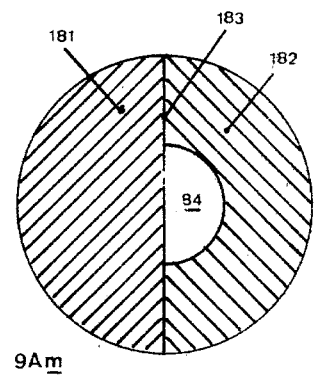
Figure 10:
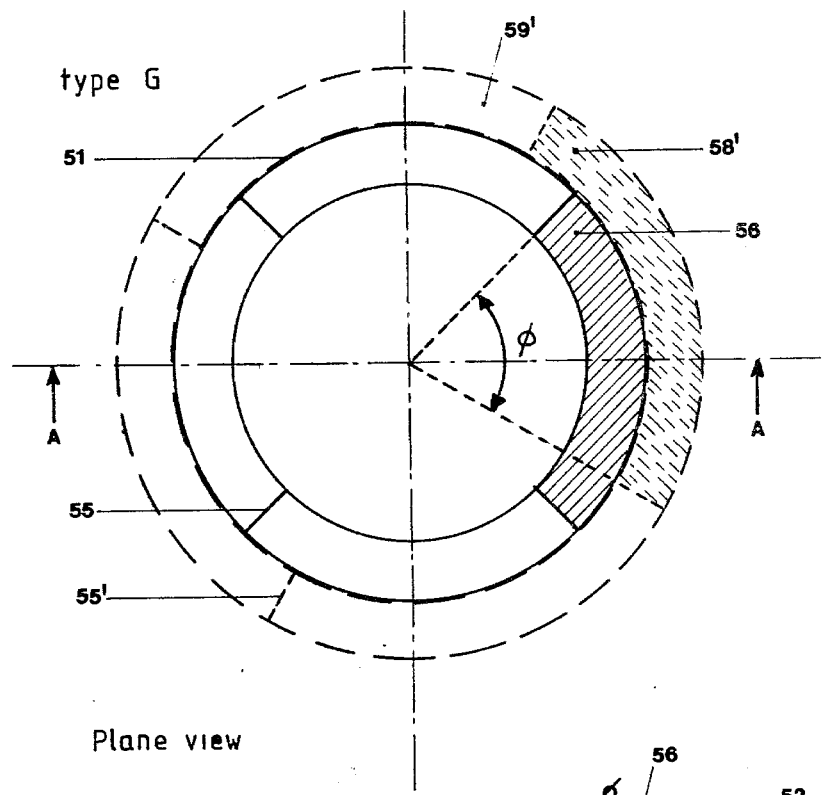
Figure 10:
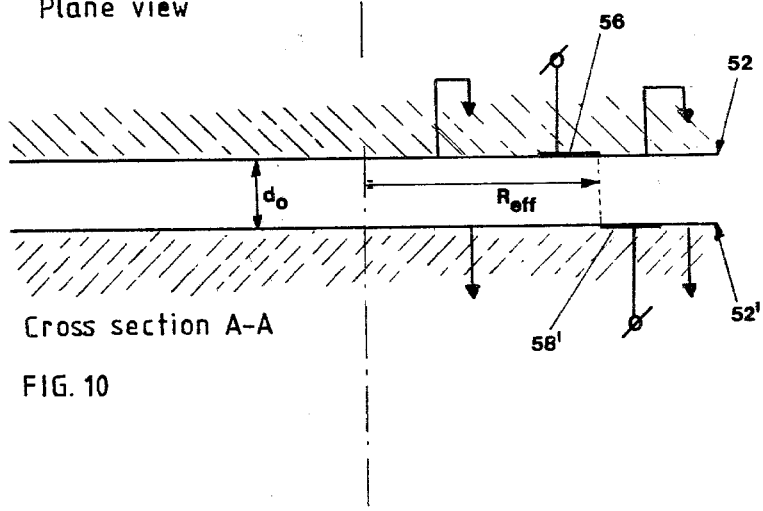
Figure 11:
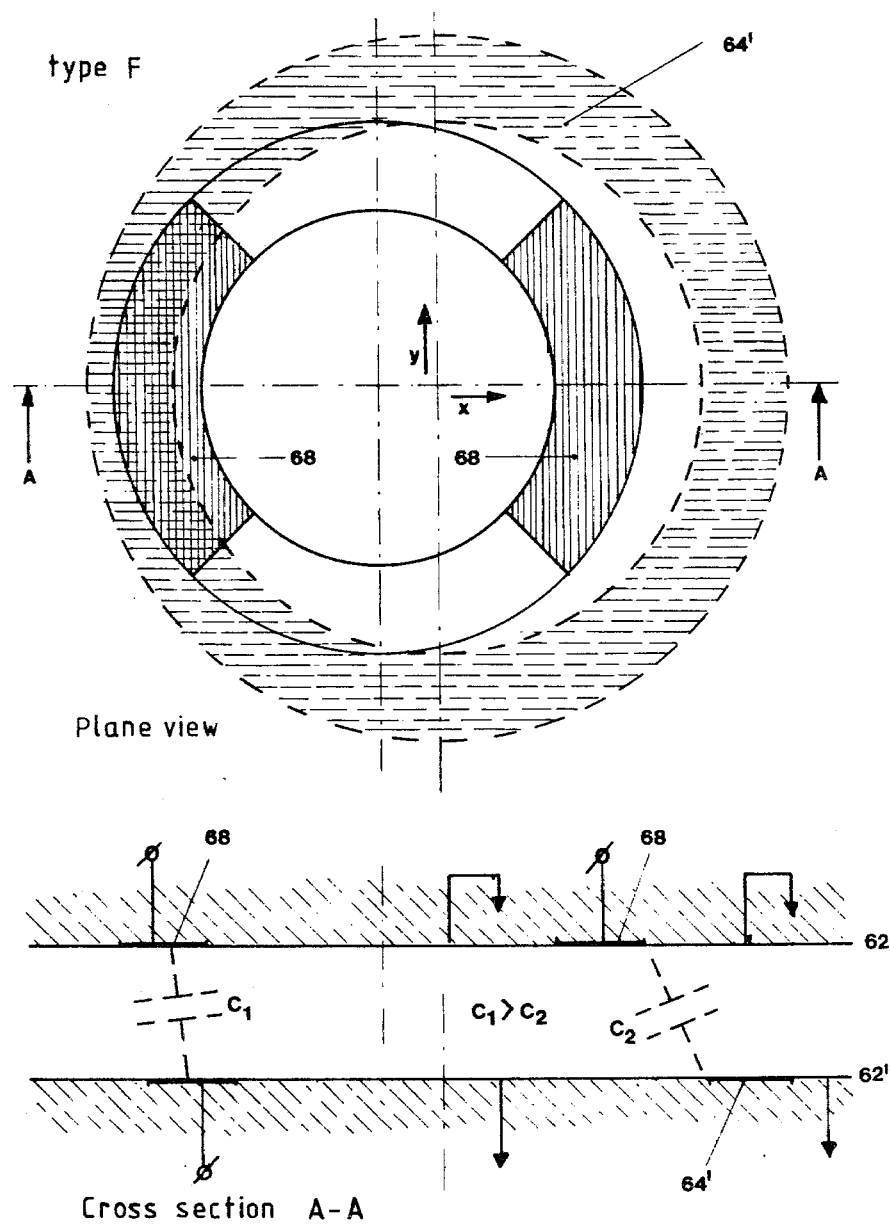
Figure 12:
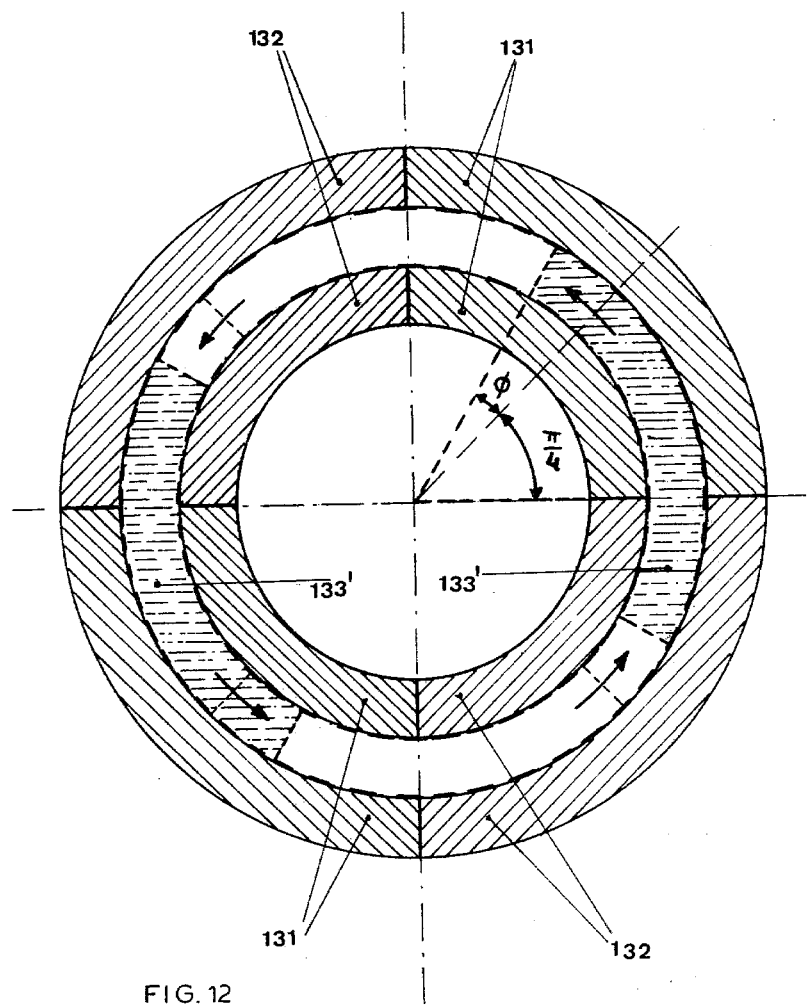
Figure 13:
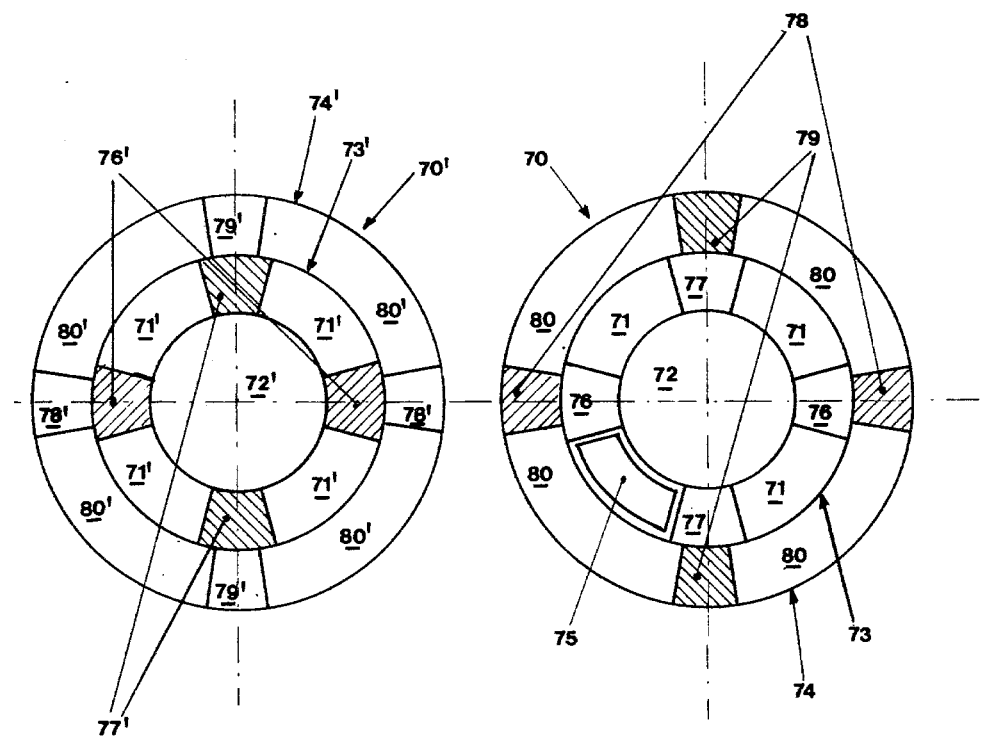
Figure 15:
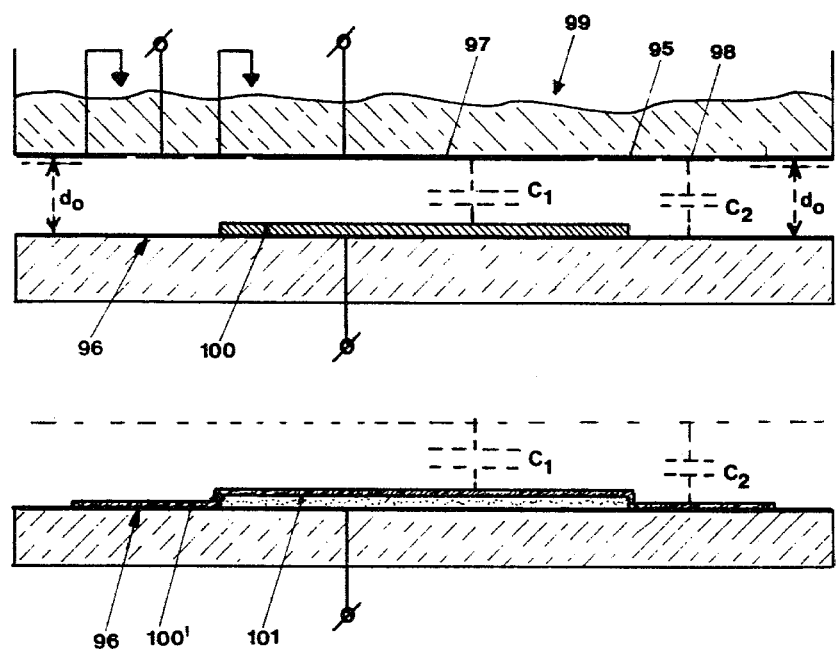
Figure 16:
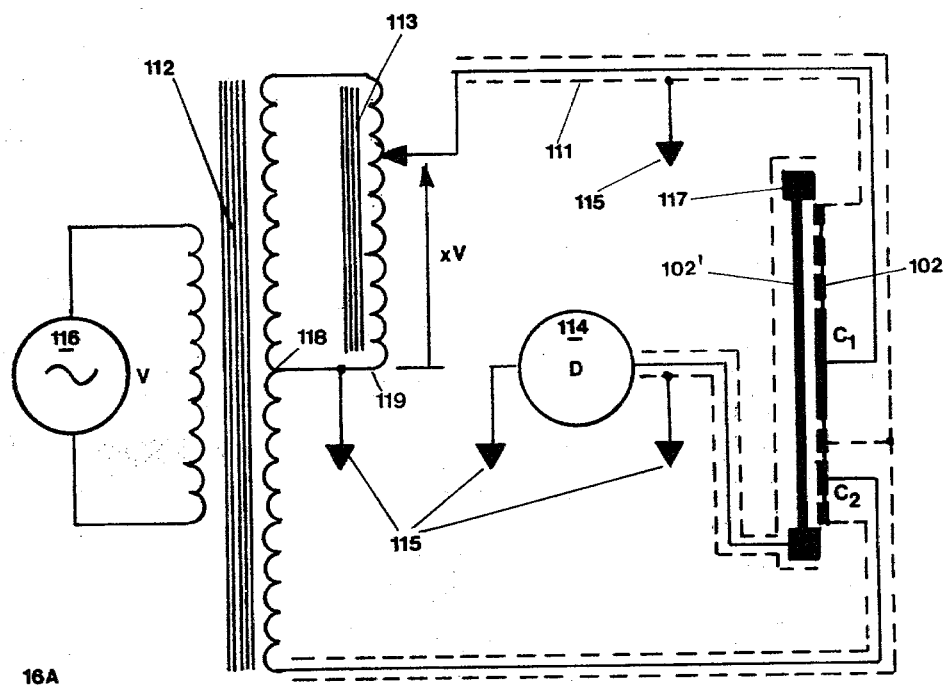
Figure 16:
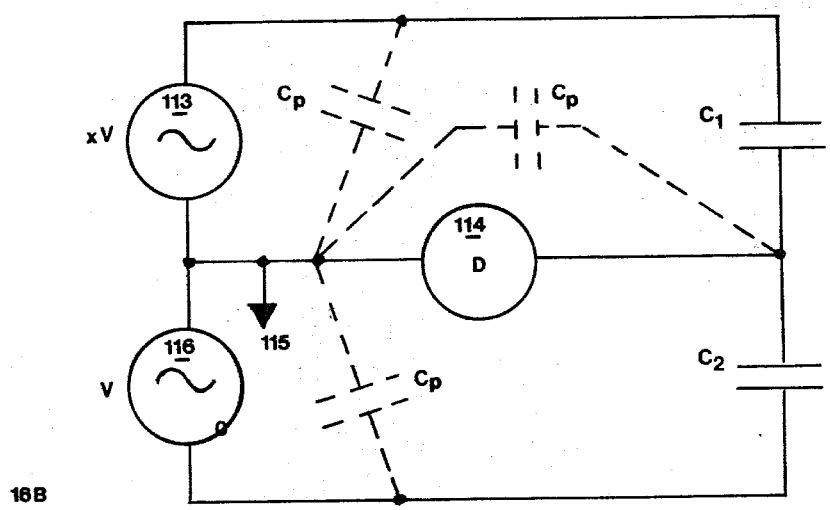
Figure 17:
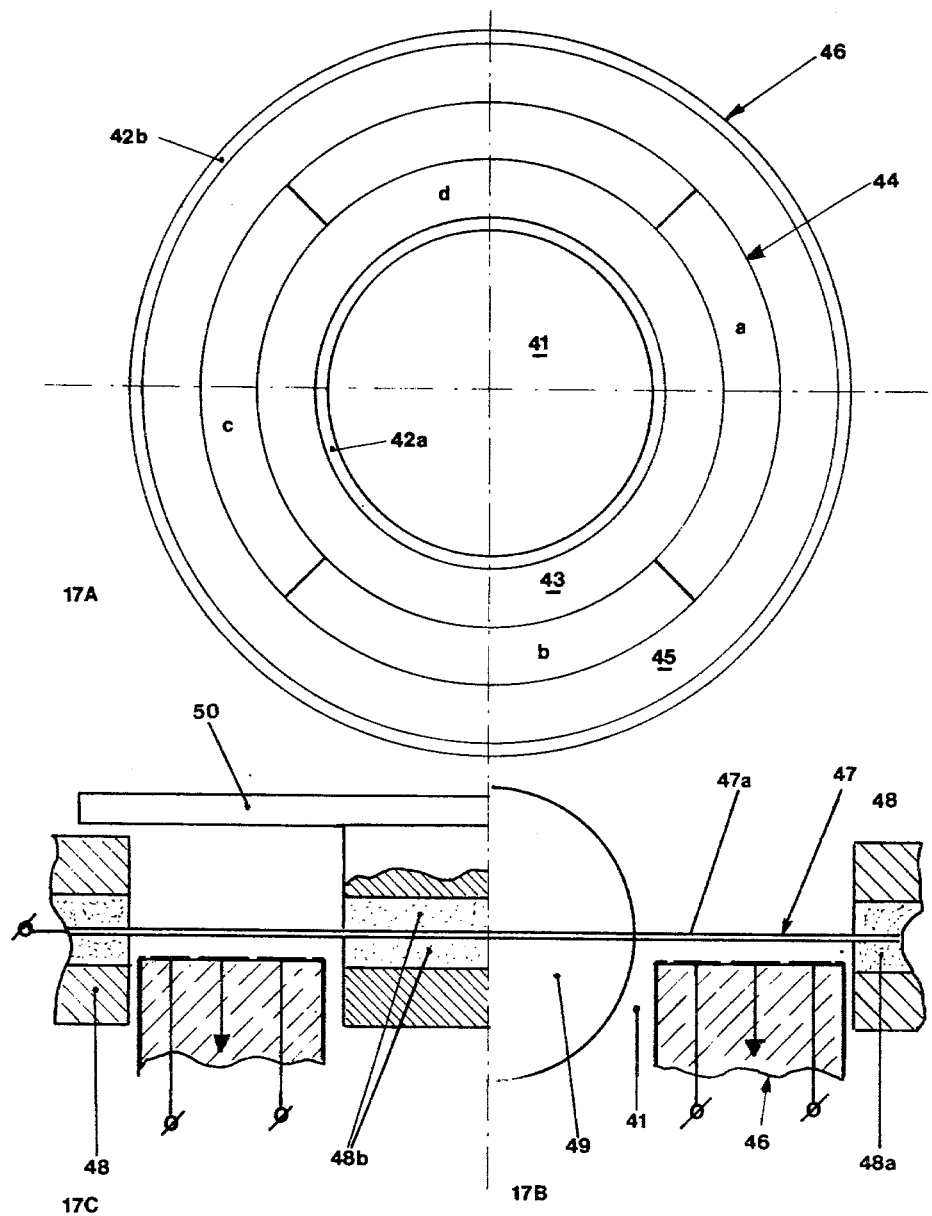
Figure 18:
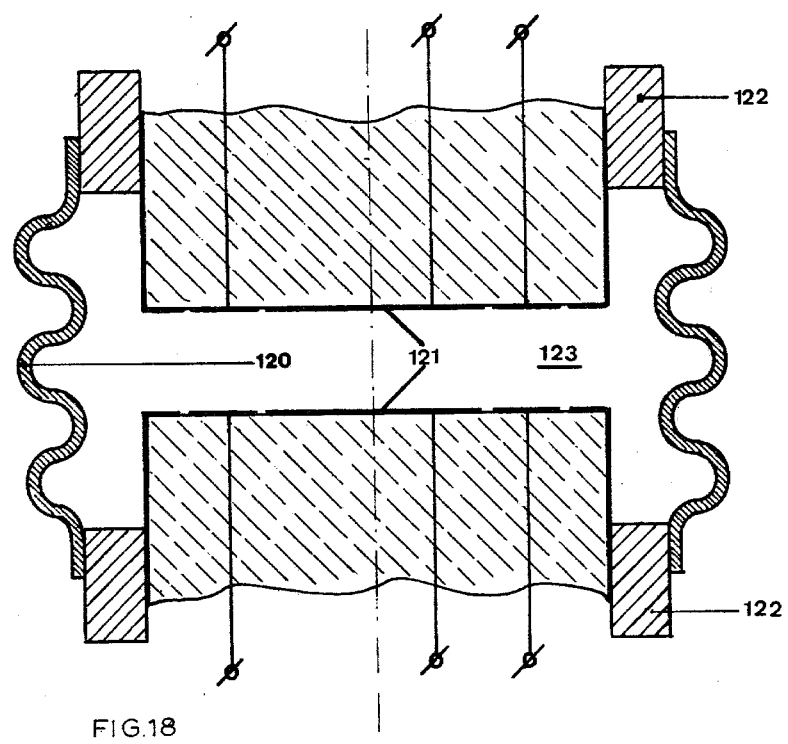

FIGS. 8a–d are examples of electrode matrices;

FIG. 9 gives an example of an electrode carrier with an inside hole:

FIG. 9A contains a plurality of embodiments a to m incl. of the principle underlying the invention;

FIG. 10 shows in a schematical way the set up of a cross capacitance;

FIG. 11 represents in a schematical way a differential capacitor as a detection system for sideway centering with cross capacitors;

FIG. 12 shows an example of a capacitive goniometer with cross capacitors;

FIG. 13 gives another example of cross capacitors with an inside hole in one of the electrode carriers;

FIGS. 14a and 14b show a gauge system with a clamped flexible electrode;

FIG. 15 gives an application of the gauge according to the invention as a thickness monitor;

FIG. 16a shows the principle of the bridge circuit;

FIG. 16b is the replacing scheme of the bridge circuit in FIG. 16a;

FIG. 17 shows the applications for a seismometer and for a weighing-apparatus;

FIG. 18 gives an illustration of the principle of surrounding the interelectrode space by a flexible, non-permeable wall.

Figure 1:
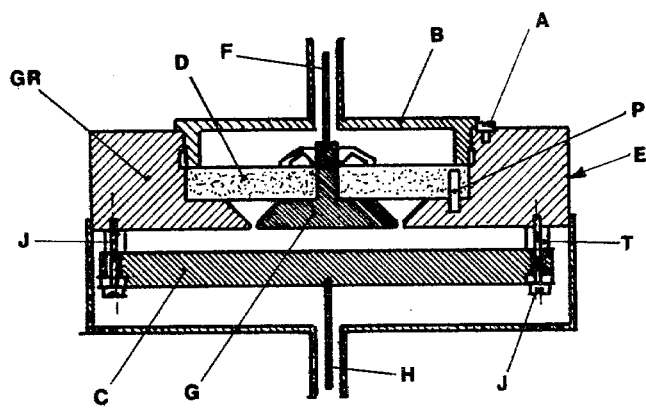

In FIG. 1 a cross-section view of a guardring capacitor is given, as it has been built since about hundred years ago after Kelvin's publication and is still being built up till now. In this construction one can distinguish a bottom electrode C and a top electrode E consisting of two parts, namely a central part G and a concentrically surrounding guarding electrode GR. The guarded electrode G, sometimes called "island", is firmly clamped and precisely centered with in the guardring GR by means of a Pyrex glassdisc D. This glassdisc is clamped with-in the guardring GR while using a flexible clampring B, which is pressed downwards in order to generate a firmly pressure on the glassdisc. The head of a locking screw A fits in a groove in the edge of the clampingring B, so the unit can be taken apart and replaced with the same force on the glassdisc D. A hole has been drilled in the edge of the glass and in the guardring for a small dowel pin P, which will be inserted by a torsion movement after completion of the construction. The island electrode G is connected to the connector F. The electrode C with the highvoltage connector H is held at a fixed distance from the guardring GR and the island G by three insulated screws J, being surrounded by three spacers T of equal length, made of Pyrex glass tube, of which the ends are flattened and planparallel.

Figure 2:
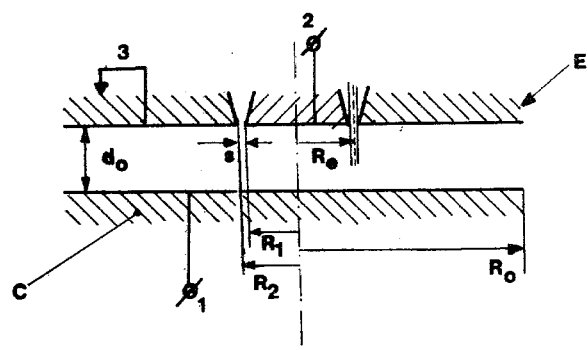

In FIG. 2 the electrode configuration of FIG. 1 is again represented, however now in a very schematical way. This cross-section illustrates several symbols, used in the description.

Figure 3:
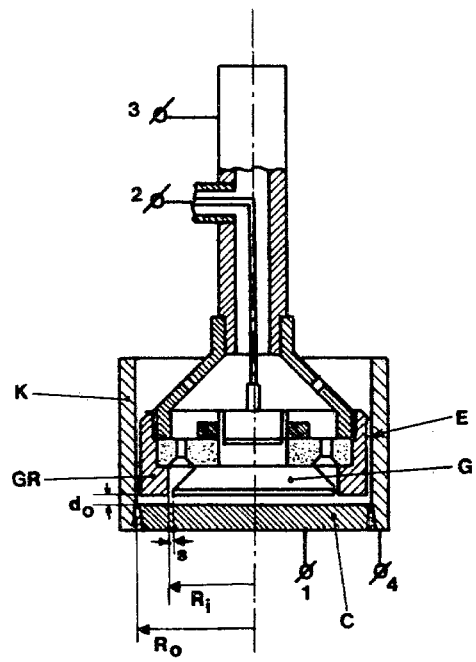
FIG. 3 shows a modern version of the Kelvin-guardring capacitor, surrounded by a sleeve, like it has been disclosed in the Article, representing the state of technics, from which the invention has been started.
Figure 4:
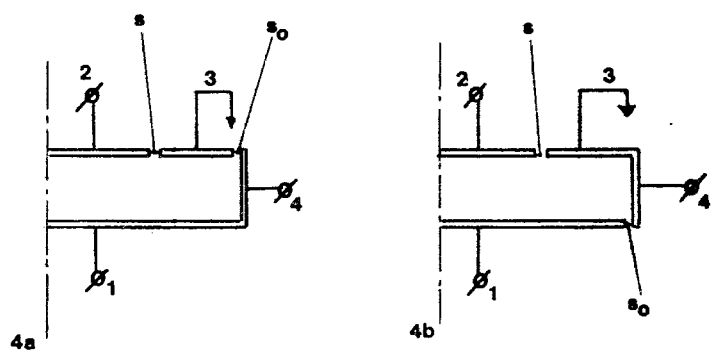
FIGS. 4a and 4b illustrate in a schematical way the two possibilities of the known guardring capacitor with the altered fringe geometry, due to the support.

In FIG. 3 a cross section of a modified Kelvin guardring capacitor is shown, which has served as a base for the invention, in order to provide several improvements. One can distinguish—like in FIG. 1—a continuous bottom electrode C with connector 1, a top electrode E divided into an island electrode G with connector 2 and the guardring electrode GR with connector 3. Contrary to the original version of the Kelvin guardring capacitor, shown in FIG. 1, the capacitor has been surrounded by a sleeve or tube K, which can be, depending on the shape of the electrode carriers or supports, of square, rectangular, circular etc. shape, and equipped with terminal 4, permitting the calculation of fringe effects. Though this modified version has reduced the inaccuracies due to the finite expansion in transverse direction with a factor of 100 to 1000, the sleeve K itself causes an inaccuracy in the exact geometry of the fringe. Like FIG. 4a shows, the sleeve 4 can be an integral part of the continuous electrode 1, so that however, beside gap s between the island electrode 2 and the guardring electrode 3 there is a second gap $s_0$ between the guardring electrode 3 and the vertical wall 4. In FIG. 4b the other possible connection is shown.

Figure 5:
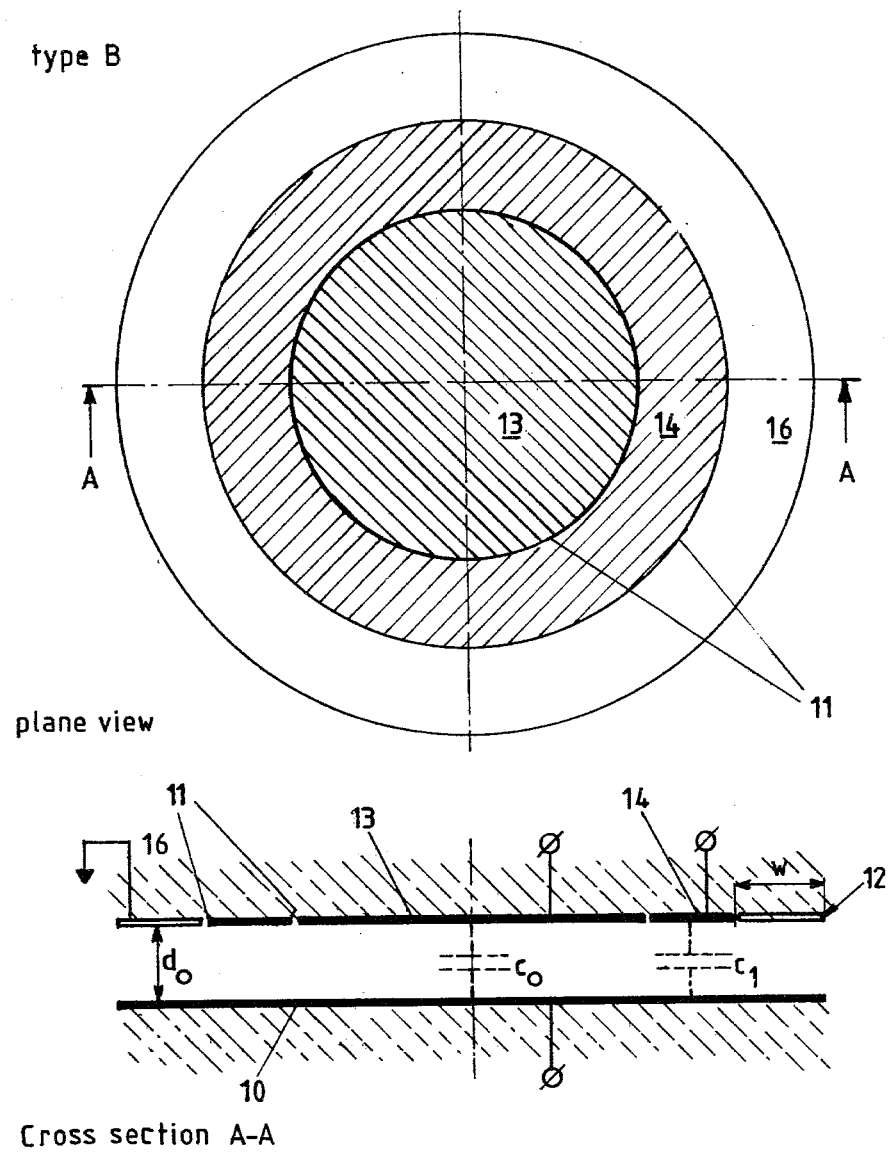
FIG. 5 shows an electrode carrier with two ring electrodes.

Based on comprehensive theoretical and practical investigations the insight of the invention leads to different possibilities, such as in the simplest case to the configuration of FIG. 5, in which the principle of the invention has been used. Here the guardring consists of a continous electrode 10 and a sub-divided electrode 12, which consists of an electrode 13 and two ring-electrodes 14 and 16 separated from each other by gaps 11. Between electrode 10 and electrode 13 respectively 14 is formed a capacitor $C_0$ and $C_1$ resp.; electrode 16 serves as a guardring for the system 13, 14, so that the guardring function of the sleeve (not-shown) could be dispensed with but of course its shielding function should be maintained. While the second ring electrode 16 serves as a guardring, two capacitors $C_0$ and $C_1$ resp. are formed between island 13, first ringelectrode 14 and opposite electrode support 10, from which the ratio can be determined. With minimum value for the ratio $C_1/C_0$ the gauge is planparallel. But it is quadratic, which means that there is no sensitivity left at the moment of its reaching the planparallel position.

Figure 6:
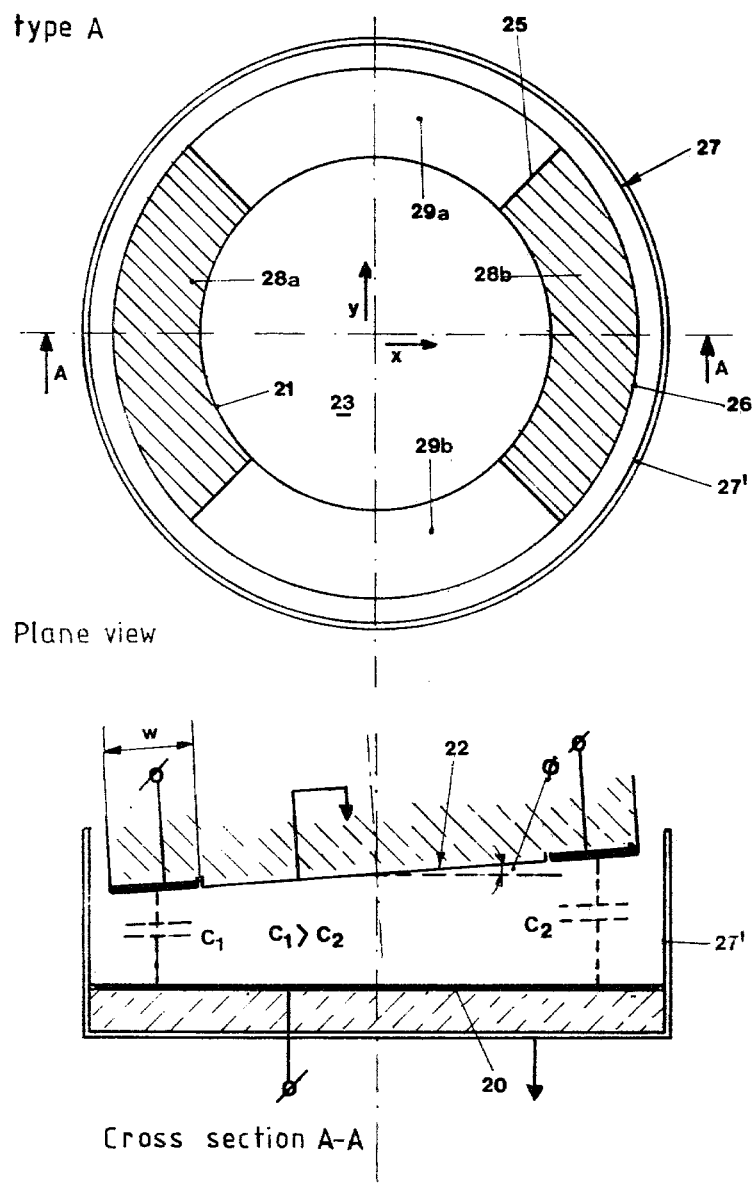
FIG. 6 represents in a schematical way a differential capacitor used as a detection system for planparallel setting of plate capacitors.

In FIG. 6 a differential plate capacitor is shown as a detection system for setting plate capacitors planparallel. One can distinguish a continuous electrode 20 and a subdivided electrode 22. This last-mentioned electrode consists of an island 23 and one ring electrode 26, which are separated by a gap 21. The ring electrode 26 in its turn is subdivided by radial gaps 25 in four segments 28, 29, each of them spanning an angle of 90°. From the said electrode surface 22 only the electrode overlay on the diametrically situated segments 28 $a$, $b$, are active—in the other segments 29$a$, $b$ serve as guard electrodes—constituting in this way with that of electrode carrier 20 two diametrically orientated capacitances $C_1$ and $C_2$, which are not equal because, like cross-section A—A shows, electrode support 22 is not planparallel to electrode support 20. Anyhow one can control the slanting angle $\phi$ by measuring the ratio of capacitances $C_1/C_2$ and if $C_1/C_2=1$ one can decide that the slanting or tilting angle in the direction concerned is zero. One has to repeat this in the direction perpendicular to the first direction, whilst making active electrode segments 29. Of course with this gauge now placed in planparallel position, the distance $d_0$ can be measured.

In this gauge the electrode segments 28, 29 are slightly influenced in their effective outer radius by variations in distance from them to the wall 27 of the sleeve or casing. This influence can be made negligible using an extra guardring, from which the width w satisfies the relation $w=5d_0$. Nevertheless within certain limits tilting can be detected and eliminated with this gauge and after that, using the capacitance between island electrode 23 and plate electrode 20, the distance $d_0$ can be measured, if all other electrode segments 28, 29 together are used as a guardring for which the normal guardring conditions must be fulfilled, namely $w=5d_0$.

If indeed the conditions for these types of plate capacitors are fulfilled, one can detect a deviation from planparallelity (tilting) with a gauge of the type A (FIG. 6), if the total electrode configuration is surrounded by a shielding sleeve 27′ functioning simultaneously as guarding. If the ring electrode 26 consists of two segments, then only in one direction; if the ring electrode is subdivided in four segments 28, 29 angularly spaced over 90°, then in two perpendicular directions.

If the ratio $C_1/C_2$ is close to 1 (for example a 5% deviation), the gauge is linear, but is of less accuracy than the type B gauge. Subdivision in four segments in regard to the dividing into two segments has no influence on accuracy, but gives an increase of sensitivity per direction, while the gauge also becomes sensitive for tilting in two perpendicular directions.

The practical difference with the type A, shown in FIG. 6, is that the type B gauge is more accurate. The gauge however is quadratic, resulting in a disappearing sensitivity for tilting on the moment that elimination of tilting results in planparallelity, while the direction of tilting cannot be determined, but its magnitude can be measured. Furthermore detection of tilting and its elimination functionates in an analogous manner as in the type A gauge.

Figure 7:
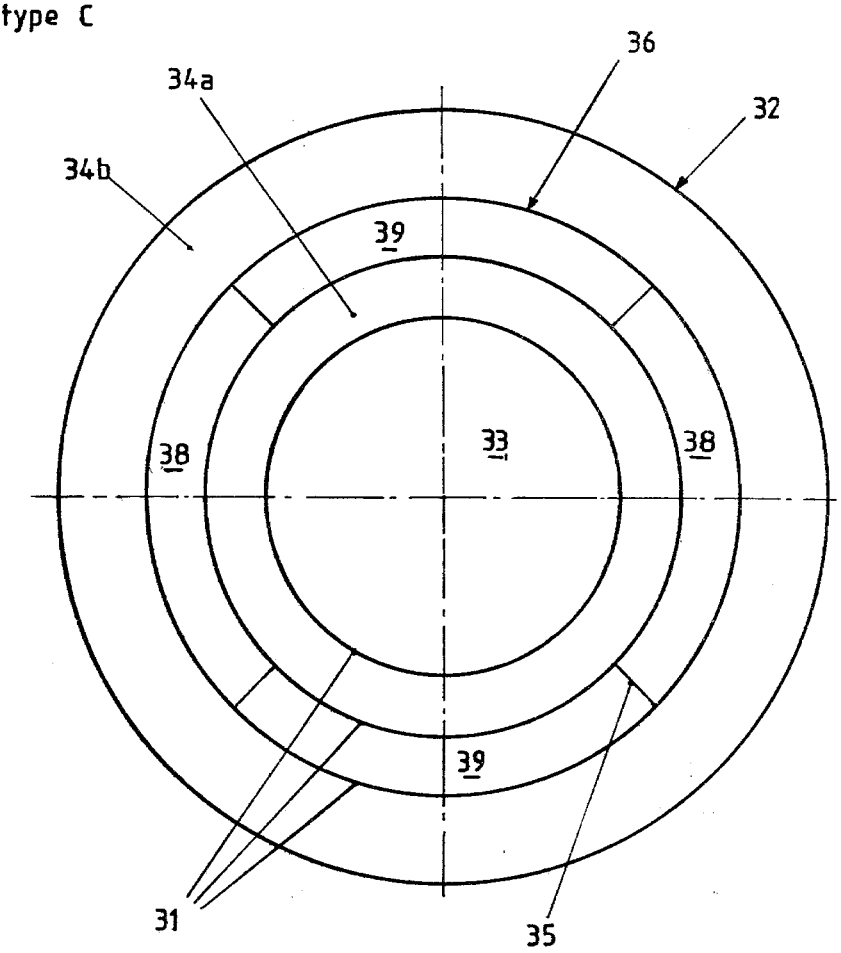
FIG. 7 is an example of a more extensive electrode pattern in an electrode carrier.

In FIG. 7 an example is shown of an electrode pattern in an electrode carrier 32, which consists of a combination of patterns mentioned before. In this configuration one can distinguish an island electrode 33, two guardring electrodes 34 and a subdivided ring electrode 36 between the first electrode 33 and two guardring electrodes 34$a$ and 34$b$. The subdivision of the ring electrode 36 consists of segments each spanning an angle of 90° in such a way that there exist one pair of diametrical segments 38 and another pair of diametrical segments 39, which are 90° offset with respect to each other. The sub-electrodes are separated from each other by concentric gaps 31 and radial gaps 35. Combining this subdidided electrode carrier or support with a continuous electrode carrier (not-shown) a differential plate capacitor will be formed, being a somewhat more extensive version of the type C. With this gauge the same measurements can be carried out as in the gauges of FIGS. 5 and 6. The gauge of FIG. 7 is typically a combination of the types A and B, in which the advantages of A (including linear output for small tilting effects) and B (including independency of lateral displacements) are combined, resulting in the type C gauge, which is linear and by means of which the tilting angle and direction can be calculated (with rather difficult formulas). Furthermore it means that the gauge of FIG. 7 has the accuracy of the type B gauge. In the case of small tilting angles, resulting in capacitance ratios that do not differ much from the average ratio (=1), this difference is directly proportional, to the tilting angle.

For setting the gauge planparallel use is made of differential plate capacitors, because these capacitors are not sensitive for lateral displacements, while for lateral adjustment especially use is made of differential cross-capacitors, because these last capacitors have no sensitivity for tilting in the environment of the equilibrium position.

Figure 8:
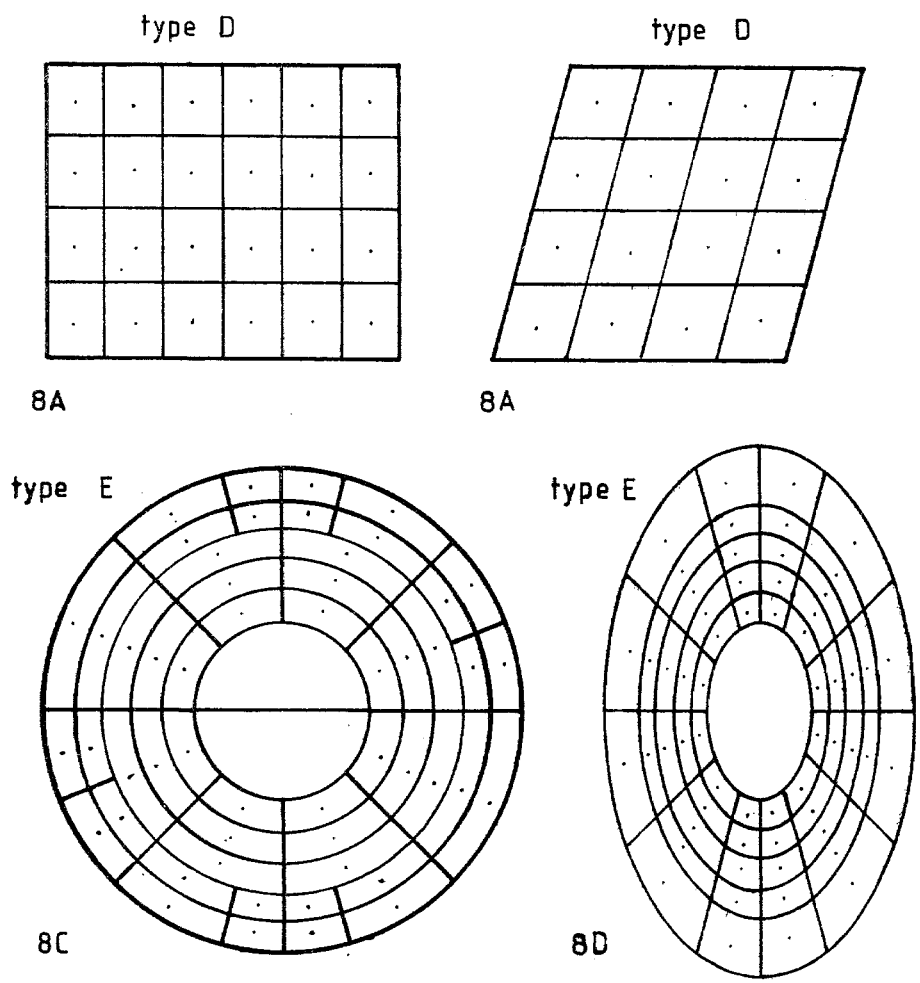

In FIG. 8 a number of examples are shown for gap patterns that can be applied on electrode carriers. In FIG. 8A an electrode matrix with rectangular coordinates is shown; in FIG. 8B a matrix with oblique coordinates; in FIG. 8C with polar coordinates and in FIG. 8D with elliptic coordinates. If one combines these electrode carriers with a second electrode carrier equipped with a similar electrode configuration, one can get a gauge of the cross capacitance type. Especially a gauge, equipped with electrode carriers of the type given in FIG. 8A, is ideal for measurements and elimination of sideway displacements, while a gauge with electrode carriers, as given in FIG. 8C are especially useful for measurement and elimination of rotations.

Also the capacitive gauge can be designed with inside holes 40, as is given in FIG. 9, provided that the conditions for shielding and elimination of fringe effects are not affected.

In FIG. 9A a plurality of alternative embodiments a to m incl. are shown; all based on the same above principle.

In FIG. 9A$a$ a rectangular electrode support plate 141 is shown, on which the electrode overlay is divided by a gap-pattern of lines crossing each other perpendicularly, such as horizontal lines 142 $a$ intersected by vertical lines 142 $b$, into sub-electrode areas in the form of squares 143. Two of these squares, to wit areas 143$a$ and 143$b$ cooperate, that means they are simultaneously active, and constitute with the electrode overlay on an opposite electrode support plate (not-shown) two capacitors by means of which a slanted position, if any, can be determined. In the case shown in the figure this is the tilted or slanted position in the Y-direction. By correct division and correct choice of the sub-electrodes on the other electrode support plate, the formation is possible of two cooperating plate-capacitors, cross-capacitors or a cooperating combination of such plate- and cross-capacitors. All the other squares, such as 143$c$, function as guard-elements.

In FIG. 9A$b$ in the electrode overlay of the electrode support plate 144 a gap pattern of concentric gaps 145$a$, $b$ and radial, interrupted gaps 146$a$, $b$ is provided, whereby the ring electrode 147 is divided into four segments. Of these the segments 147a and b are activatable and cooperate in the X-direction for determining the slanted position, if any, in that direction. For the rest they are surrounded by guard-elements 147c.

In FIG. 9Ac a combination of horizontal and vertical gap lines 148a, b and diagonal gap lines 149a, b is drawn to form activatable sections 150a, b, which cooperate for the determination of the slanted position, if any, in the X-direction. The surrounding sections function as guard-elements 150c.

In FIG. 9Ad is shown an electrode support plate 151, of which the electrode overlay is divided by a pattern of gap lines 152a and 152b resp., which extend as slanting coordinates (X and Y'), into diamond-shaped areas 153. Some of them, viz. 153a–d, are activated for the formation of a capacitance with electrode elements on the opposite electrode support plate (not-shown), whereas the remaining areas 153e function as guard-element so that the activatable sub-electrode 153a–d are surrounded from all sides by guard-elements 153e, in a geometrical respect. The sub-electrodes 153a and b cooperate (are simultaneously active) for determining the slanting position, if any, in the X-direction, and the sub-electrodes 153c and d in the slanted Y'-direction. Also in this manner a plan-parallelity of high accuracy ($1:10^6$ or $1:10^7$) is obtainable.

In FIG. 9Ae about the same situation as in FIG. 9Ad is shown with the sole difference that here the "work" is done with three activatable sub-electrodes 158a–c being in geometrical respect surrounded from all sides by guard-elements 158e. The sub-electrode 158b cooperates in the X-direction with sub-electrode 158a and in the Y'-direction with sub-electrode 158c.

In FIG. 9Af a situation is shown, comparable to that of FIG. 9Ae, for a rotation-symmetrical electrode support plate 154. Also in this case there are three activatable sub-electrodes 157a–c enclosed between concentric and radial gaps 155 and 156, and bound geometrically by elements 157d functioning as guard-element. In this respect the sub-electrodes 157b constitute both with sub-electrode 157a and with 157c a pair of cooperative sub-electrodes for the determination of the slanted position either in the X-direction or in the Y'-direction.

In FIGS. 9Ag–m embodiments are shown, in which the sub-electrodes to be activated adjoin each other in geometrical respect, or in other words are apparently not surrounded completely by guard-elements. However, as soon as the sub-electrodes to be activated have indeed become active, they are each individually surrounded again by guard-elements, due to the fact that they function mutually for any other one as guard-element, so that again the principle of the invention is satisfied. Thus, although a certain sub-electrode is an active element on its own, it can function with respect to any other active element as a guard-element. This situation can be reached, when for example two adjoining or adjacent sub-electrodes are connected in a bridge-circuit such that any of them is connected to earth through its own low-impedant power-source. A bridge-transformer included in the circuit makes that the said power-sources are identical. The electric separation between the sub-electrodes takes place therefore in the bridge-circuit; see the equivalent network of a bridge-circuit shown in FIG. 16B. In this way a very compact arrangement of the capacitor is obtained due to the elimination of the "intermediate spaces" between cooperating activatable sub-electrodes.

As shown in FIGS. 9Ag and h, sub-electrodes 161a cooperate in the X-direction with adjoining sub-electrode 161b on an electrode support plate 162, being placed with a strongly exaggerated slanted position, opposite an electrode support plate 163. The sub-electrode 161a, b are in geometrical respect separated from each other solely by a gap 164.

In FIG. 9Ai semi-circular electrodes 166, 167 separated by a gap line 168, cooperate for determination of the slanted position in the Y-direction. The semi-circle 167, on its turn, is divided through the gap line 169 into two circle-quadrant electrodes 167a and 167b cooperating in the X-direction.

In FIG. 9Aj sub-electrode 171a cooperates one moment with adjoining or adjacent sub-electrode 171b and the next moment with opposite sub-electrode 171c.

In FIG. 9Ak the sub-electrodes 173a, 173b cooperate in the X-direction. It is seen that they are not surrounded completely by guard-elements, but meet each other along the interrupted gap 174.

In FIG. 9Al are shown two cooperating, adjoining ringelectrodes 176, 177 being separated along a gap 178.

In FIG. 9Am an example is given of the case that two sub-electrodes 181 and 182 in geometrical respect are separated partly by a gap 183, partly by a sub-electrode 184 functioning as guard-element.

The above considerations about FIG. 9A are valid both for plate-capacitors and for cross-capacitors. Both the great accuracy in the plan-parallel setting of planes and the elimination of angular deviations is of special importance in the manufacture of integrated circuits on chips.

In FIG. 10 a gauge using cross capacitances is given. In this gauge a segment 56 in the top electrode carrier 52 functionates together with segment 58' in the bottom electrode carrier 52' as a cross capacitor. In projection both the electrode segments are situated on both sides of the common part of the gap 51. All other electrodes, surrounding the concerned segments, are used as guard electrodes. With one single cross capacitance 56–58' the gauge is quadratic, with two cross capacitances 56–58' on the left respectively on the right side the gauge becomes linear for small displacements in sideway directions and the component of translation in the X-direction can be measured and eliminated. By repeating this process for two cross-capacitances 57–59' one can find the component of translation in the Y-direction.

From the hatched regions in FIG. 11 it can be seen that the gauge is constructed as a differential cross capacitor, with which sideway deviations (translations) can be measured respectively eliminated. The differential cross capacitor of FIG. 11, representing type F, is created between a ring electrode 64' in the bottom electrode carrier and the ring segments 68 in the other electrode carrier 62 oriented in pairs, diametrically opposite to each other and being chosen such that per ring segment with the ring 64 a cross capacitance is formed. Centration in the direction concerned has been realised if the two cross capacitances are equal. Repeating this process for the direction perpendicular to the first one with two other ring segments causes the electrode carriers to be centred in a lateral direction. Both centering actions can be repeated several times in order to achieve higher accuracy.

If two electrode carriers, provided with identic ring patterns, in which the electrode are switched in crosswise position, are superposed as shown in FIG. 12, then, within the effects of second order errors in lateral translations and in the distance between the two electrode carriers, relative rotation of the two carriers around their common axis over an angle $\phi$ is correlated with the produced sums of cross capacitances according to $$\frac{\Sigma C_{c1}}{\Sigma C_{c2}} = \frac{\pi + 4\phi}{\pi - 4\phi} \text{ or } \phi = \frac{\Sigma C_{c1} - \Sigma C_{c2}}{\Sigma C_{c1} + \Sigma C_{c2}} \cdot \frac{\pi}{4}, \quad (4)$$

where $\Sigma C_{c1}$ is the sum of cross capacitances between electrodes 131 in the top electrode carrier and electrodes 133' in the bottom electrode carrier. An analogous relation is valid for $\Sigma C_{c2}$.

Based on this principle measurements of angles with cross-capacitances is possible.

Also other patterns are possible, but they must all have the characteristic that, if small lateral translations of one of the electrode carriers in regard to the other occur, an increase of capacitance of one of the contributing cross-capacitances will be compensated by a decrease of capacitance of one of the other cross capacitances, belonging to the same total cross-capacitance.

Now again holes in the electrodes can be permitted under the same conditions as mentioned before.

In FIG. 13 a gauge with quasi-identic ring patterns has been given. In this figure (on the left) a bottom electrode carrier 70' has been given and (on the right) an "identic" top electrode carrier 70. Each electrode carrier consists of an island 72', 72, a first ring electrode 73', 73 and a second ring electrode 74', 74. The ring electrode 73, 73' is in its turn subdivided in eight segments 71, 76, 77 respectively 71', 76', 77', where the segments 71 and 71' serve as guard electrodes. Equally the ring electrode 74 respectively 74' is subdivided in eight segments 78, 79, 80 respectively 78', 79', 80', where the segments 80 and 80' serve as guard electrodes. The meaning of the several given segments is the following: segment 78 of electrode carrier 70 and segment 76' of electrode carrier 70' constitute together a cross capacitance. Diametrically a similar second cross capitor can be formed, so that in horizontal direction there exists a differential cross-capacitor. But in the direction perpendicular to the first mentioned direction, one can also distinguish a differential cross-capacitance by combination of 77' and 79. The difference of pure congruence of both electrode carriers 70 and 70' exists of the fact that one of the guard segments 71 has a hole 75 in it. Although this segment cannot serve as a guard electrode, this is not an objection, because sufficient shielding is given by the segments 76, 77 and 80.

Figure 14:
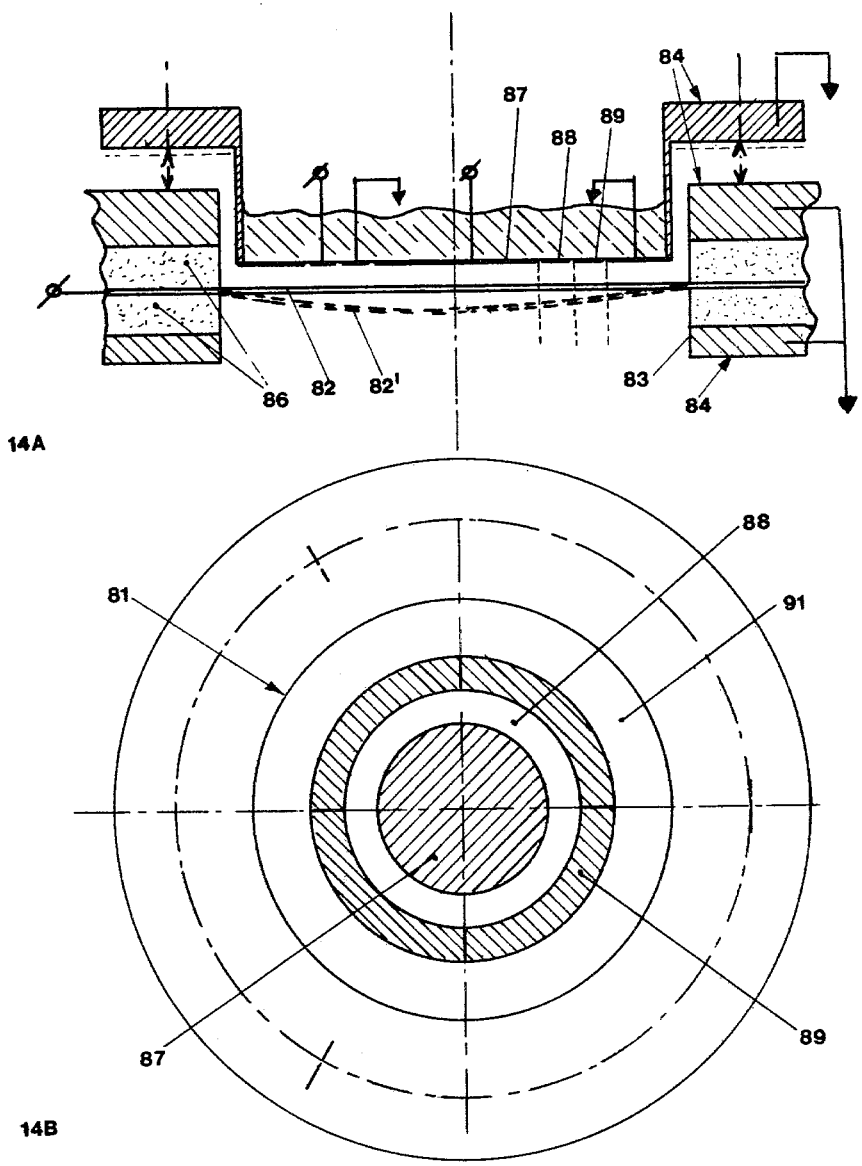

An important application of the principle of the invention is the measurement of differences in level of a clamped flexible electrode like an electrically conducting membrane (FIG. 14), deflecting or sagging under the influence of gravity (gravitational pressure), a pressure difference (mechanical pressure), a difference in electrical potential between electrode carrier and membrane (electrical pressure) and other loads over the divided surface as well as local by acting forces. In FIG. 14A a cross section view of such a gauge system is shown; in FIG. 14B a bottom view of the first electrode carrier 81 is shown. A flexible electrode carrier 82 is clamped in the wall 83 of a clamping structure 84 and is insulated electrically by insulation material 86. The first electrode carrier 81 consists of an island 87, a guardring 88, a ring electrode 89 and a guardring 91, which is connected with the clamping structure 84. With the dotted line 82' the bending of the flexible electrode 82 under the influence of gravity is given schematically.

One can see clearly in FIG. 14A that for the island 87 and for the ring 89 the distances are different, so that with equal areas of both electrodes 87–89 the existing capacitances are also different. In the case of bending the capacitance ratio will be $\neq 1$. If the ratio $=1$, the membrane is flat again. While maintaining the demands formulated before, and while replacing the variable distance setting between the flexible electrode 81 (membrane) and the electrode carrier 82 by a rigid stable orientation, a measuring system for bending is achieved, which is highly independent of temperature and therefore has no need to be thermostrated.

The change of the capacitance ratio is linear up to deviations of several percents of the nominal one to one ratio, unless the distance between electrode carrier 82 and flexible electrode 81 is so large that there cannot longer be spoken of small deflections of the flexible electrode.

Using identic electrode carriers on both sides of the membrane and in the bridge commutatively switched connections, a more linear gauge, if so desired, in the higher pressure range will be achieved.

If the user is informed about the value of the mass per unit area of the flexible electrode, he is able to calibrate in situ the gauge even in an absolute way, if the local gravity is known, simply by turning over the gauge between the positions in which the flexible electrode either underlies or overlies the other electrode carrier.

Now the previous principle is no more restricted to very small pressure differences. Thin, hardly stretched membrane material with a low value for the mass per unit area gives a differential pressure gauge for sensitive applications. On the other hand thick, heavily stretched plate material with a high value for the mass per unit area gives an absolute differential gauge for large pressure differences.

Another important application is the capacitive gauge for measuring thicknesses of coatings, layers, etc. (FIG. 15). If one realizes that average level differences in the distances between the measuring object 96 and the island electrode 97, respectively the segmented ring electrode 98 with a nominal distance of 100 $\mu$m can be measured with a resolution of seven decimals, one can conclude therefrom that average differences in level can be detected with a resolution of $10^{-11}$ m. Reducing the distance between the electrode carrier 99 and measuring object 96 this resolution can be improved. Using stable electrode carriers and, as far as the surface is concerned, stable measuring objects, measurement of capacitance ratios before and after deposition of an evaporated layer 100 on the measuring object with a lateral extension lying half between the gaps on both sides of the guardring 95 between island electrode 97 and segmented ring electrode 98, whereafter in case an evaporated insulator 101 is used, again the entire measuring object is provided with a homogenuous conducting layer 100', to conduct thickness measurements of the layer concerned, in principle with a resolution of $10^{-7}$ of the chosen nominal distance between electrode carrier and measuring object and in an absolute way.

Also simple investigations of radiation damages of metal surfaces are possible.

The conditions for capacitance measurements are as follows: the capacitances are small, namely in the order of 10 pF. Therefore in the bridge circuits for measurements of these capacitances utmost care has to be taken in order to eliminate the influences of parasitar capacitances and dielectric losses. For that reason the construction of the capacitive sensor must have such a form, that between the plate electrode 100 (measuring object 96) opposite to the electrode carrier 99 and those electrodes 97, 98 in the electrode carrier, which will not be used as guard electrodes, nowhere in the circuit a path can be found through a dielectricum, differing from that of the space between plate electrode and electrode carrier.

All connections and the other parts of the electrode carrier 102, 102' therefore have to be surrounded by a complete electrical shielding 111. Then the capacitances $C_1$ and $C_2$ can be compared mutually in a bridge circuit by connection of a bridge transformer 112, combined with a decade transformer 113, a detector 114 and a generator 116. The centre point 118 of the bridge transformer 112 as well as the zero point 119 of the decade transformer 113 are connected with earth 115. At the moment that the detector current becomes zero the following relation is valid:

$$x \cdot C_1 = C_2, \tag{5}$$

where x is the setting of the decade transformer 113 (FIG. 16A).

The existing parasitic capacitances $C_p$ are partly parallel to the detector 114 and have then only influence on the sensitivity of that detector, but if this sensitivity is of sufficient magnitude, they have no influence on the accuracy of the measurement. Partly they are parallel to the branches of the bridge transformer 112 or they occur between earth and tap of the decade transformer 113. Since both transformers are dimensioned with extreme low impedances, the parallel parasitic capacitances do not affect the voltage ratios in the bridge or do this to an extremely small extent.

With such systems resolutions of $1:10^7$ can easily be achieved, so accuracies of 0.1 ppm can be reached.

If the detector 114 has been chosen as a so-called phase sensitive system, then near bridge balance the output of this lock-in amplifier is directly proportional with the rate of bridge unbalance, if the phase has been set properly.

For introduction of DC voltages on the electrodes, in order to provide electrostatic forces, between electrode carriers, the central point of the bridge transformer 112, to which all guard electrodes are connected, can be disconnected from earth 115 and via a low impedance DC voltage source connected to earth. The input impedance of the detector has to be of the resistive type, to avoid DC voltage loss over the detector.

Furthermore the electrode carrier has to be placed within a sleeve, which, where necessary, permits an extremely stable setting of planparallel position and eventually sideway centring of the electrode carrier in regard to the second electrode carrier.

The sleeve just mentioned, together with the metallized surfaces of the electrode carrier have to form an electrical cage, within which can be made the connections of the several electrodes, not mutually shielded but mutually insulated, with the connectors in the outside wall of the sleeve.

Also outside the sleeve of the electrode carrier the leads of the several electrodes have to be shielded electrically from those sub-electrodes which are directly connected to the detector.

The whole system can be provided with automatic switching of electrode combinations, digital signal processing and controlling and on-line data-processing.

Only those aspects of the conditions for the mechanical construction, which have direct or clearly indirect influences on accuracy of the capacitive sensor, will be mentioned here:

The electrode carrier has to be made of insulation material (glass, ceramics), through which (in the mechanical sense) free of tensions and placed in a certain pattern, connecting wires between the electrode surface and the back of the electrode carrier can be provided.

After surface grinding and polishing a metal coating has to be applied on this carrier adhering to said surface and making a stable contact with all connection wires provided. Properly centred, using etch techniques, the electrode pattern has to be provided in the metallic layer, such that the several sub-electrode surfaces become mutually electrically insulated.

The electrode carrier 102 must have enough rigidity in order to guarantee that the own saggings are negligible with respect to the saggings, if any, of plate electrodes or membrane electrodes 102', which can be disposed as measuring objects opposite to the electrode carrier.

Facts that have indirect influences are the following: Size and choice of materials should be such that the influences of thermal expansion of parts of the construction, responsible for the setting of the distance between the electrode carrier and the object to be measured, are eliminated as good as possible. If possible the material of the electrode carrier has to be chosen as insulators with extreme low coefficient of thermal expansion.

As an illustration: A coefficient of thermal expansion equal 0 of just the electrode carrier material provides a totally temperature—independent measurement of electrode distances.

To these conditions must, for vacuum applications, be added that the construction may not have small, difficulty degassing holes, communicating with the vacuum chambers, and that the materials being used must be suitable for vacuum applications, while for ultra-clean vacuum systems the gauge must be bakeable to 200° C.

For the use in agressive environments either the electrode overlays 121 and electrode carriers 122 have to withstand this or, if necessary, the capacitance measuring environment 123 must be provided with a flexible non-permeable envelope 120, as is shown in FIG. 18.

If the capacitieve sensor is used for the measurements of differences in the level of an electrically conducting surface of a measuring object, then at first the capacitance of the plate capacitor is formed by a suitable electrode together with the object (using the ideal plate capacitor formula (3.a), which means the local distance between electrode carrier and object defined by $$d_0 = \epsilon_0 \epsilon_r O_1 / C_1, \tag{6}$$

where $O_1$ is the surface of the electrode concerned and $C_1$ the capacitance. The value of $C_1$ will be measured in the capacitance bridge mentioned before in comparison with a standard capacitor $C_s$ with known value (FIG. 16A). $C_s$ will be connected between the tap of the decade transformer and the detector entrance, while $C_1$ will be placed in the other branch of the bridge. If the bridge is in balance, the tap is in position $x_1$, one will find:

$$C_1 = x_1 C_s \text{ and } d_{01} = \epsilon_0 \epsilon_r 0_1/(x_1 C_s) \quad (7)$$

By replacing the standard capacitor $C_s$ in the bridge circuit in further measurements by one of the other capacitors $C_i$, formed by one of the other electrodes with sub-surface $0_i$ in the electrode carrier together with the measuring object, the ratio of both local distances between the electrodes and the object, in the new equilibrium position $x_i$ of the tap of the decade transformer, is given by $$d_{0i}/d_{01} = x_0 i 0_i / 0_1 \quad (8)$$

If relatively small, if any time-depending small changes in the overall electrode carrier—object distance occur, caused for example by temperature or other disturbing effects, resulting in planparallel displacement of the electrode carriers, then these influences only provoke second-order effects in the measurement of the ratio $x_i$. Owing to this small relative errors in the measurement of level differences will occur.

In FIGS. 17A–C practical applications of the gauge according to the invention are given for a seismometer and a weighing apparatus respectively. In the cross-section of 17B and 17C are given in FIG. 17B the right half of a seismometer and in FIG. 17C the left half of a weighing apparatus. In FIG. 17A the associated electrode carrier 46 is given, where at the place of the island electrode a hole 41 is created, surrounded by subsequently a small guardring 42a, a measuring electrode 43, a ring electrode 44, sub-divided in segments a–d for tilting adjustment, furthermore a second measuring electrode 45, and finally a small guardring electrode 42b.

In FIG. 17B the electrode carrier 46 is situated underneath flexible electrode 47, which is clamped in a clamping structure 48, electrically insulated from it via insulation material 48a. The electrode 47 is flexible in a ringshaped area 47a. Inside that ring the electrode carrier 47 is connected with a mass 49, fitted in the hole 41 in the electrode carrier 46.

In FIG. 17C rotation-symmetrical parts have been given the same reference numerals as used before. In this figure a weighing apparatus is shown, in which the mass is modified into a table 50, which is electrically insulated from the flexible electrode carrier 47, using insulation material 48b. In operation the table 50 together with the clamping structure 48 is connected to the central earthpoint 115 of the bridge.

What we claim is:

1. Capacitive sensor, comprising at least one capacitor to be connected in a bridge circuit, said capacitor having at least one of its electrode supports coated with an electrode overlay such that a system of gap-separated sub-electrodes is formed, of which at least one functions as a guard element and at least one functions as a capacitor element, if activated, said system being electro-statically shielded by a sleeve surrounding the electrode supports, characterized in that a sub-electrode (28a) functioning, if activated, together with a related area of an opposite electrode plate as a capacitor element, cooperates with at least another similar simultaneously activatable sub-electrode (28b) forming together with a related area of the opposite electrode plate another capacitor element, which sub-electrodes (28a, b) even if they are in a geometrical respect separated by at least a gap or similar means, yet are surrounded from all sides by sub-electrodes (23, 29; FIG. 6) functioning as guard elements.

2. Capacitive gauge according to claim 1, characterized in that each activatable sub-electrode is surrounded, from all sides, by guard-elements.

3. Capacitive gauge according to claim 1, characterized in that activatable sub-electrodes adjoining each other in a geometrical respect wholly or partly only separated by gaps, are connected to earth through separate power sources.

4. Capacitive gauge according to any of the preceding claims 1–3, characterized in that to obtain—in an electrode support embodiment departing from the rotation-symmetrical shape–simultaneously activatable sub-electrodes separated by sub-electrodes functioning as guard-element, a gap-pattern is provided in the electrode overlay according to slanting or rectangular coordinates.

5. Capacitive gauge according to any of the preceding claims 1–3, in which the electrode overlay is divided into a plurality of sub-electrodes by a plurality of concentric gaps and at least one radial gap whether or not interrupted, characterized in that in order to obtain simultaneously activatable sub-electrodes separated by sub-electrodes functioning as guard-elements, at least one radial gap, whether or not interrupted, is provided in the electrode overlay.

6. Capacitive gauge according to any one of claims 1–3, characterized in that a sub-electrode functioning as activatable capacitor element cooperates with another sub-electrode lying one moment in a first coordinate direction, and the next moment in another coordinate direction.

7. Capacitive gauge according to any one of the preceding claims 1–3, characterized in that in any of two different coordinate directions, two separated, activatable sub-electrodes cooperate together as a pair.

8. Capacitive gauge according to claim 7, characterized in that two interrupted radial gaps are provided in the electrode overlay such that four sub-electrodes are formed being offset over 90°.

9. Capacitive gauge according to any one of the preceding claims 1–3, characterized in that the second electrode support is likewise divided into sub-electrodes by means of a pattern of intersecting gaps in an analogous manner as has happened with the first electrode support.

10. Capacitive gauge as claimed in claim 9, characterized in that the gap pattern of the second electrode support exhibits in plan view the mirror image of that of the first electrode support.

11. Capacitive gauge as claimed in claim 10, characterized in that the second electrode support as regards its sub-electrode configuration is identical to the first electrode support.

12. Capacitive gauge as claimed in claim 9, characterized in that a sub-electrode in one electrode support and a sub-electrode in the other electrode support are combined into a cross-capacitor.

13. Capacitive gauge as claimed in claim 9, characterized in that both sub-electrodes, contributing to the cross-capacitance, are sub-divided by radial gaps into equal segments, which are connected in pairs to form diametrically orientated cross-capacitances for measurement and/or elimination of rotations.

14. Capacitive gauge as claimed in any of the preceding claims 1–3, in which the second electrode support is connected to the shielding sleeve, characterized in that for application as a position measuring apparatus the second electrode support is a flexible plate or membrane, being mechanically connected to, but electrically insulated from the sleeve.

15. Position measuring device as claimed in claim 14, characterized in that the electrode arrangement is provided on both sides of the flexible electrode acting as the plane of symmetry.

16. Device as claimed in claim 14, characterized in that the flexible part of the flexible electrode is ring-shaped.

17. Device as claimed in claim 16, characterized in that the flexible electrode in its centre is provided with a rotation symmetrical mass.

18. Device as claimed in claim 17, characterized in that the gauge is constructed as a weighing apparatus.

19. Device as claimed in any one of the preceding claims 1-3, characterized in that each of the participating electrodes are connected with a commutator.

20. Device as claimed in any one of the preceding claims 1-3, characterized in that the space between the electrode supports is closed by a non-permeable flexible casing.

21. Position measuring device built up of a system of capacitances consisting of an assembly of sub-electrodes adjoining each other along gaps, provided—according to appropriate patterns—on at least one of a set of at least two insulating electrode supports being movable and/or adjustable with respect to each other within a sleeve, the system of capacitances being included into one or more measuring bridges having a common neutral point, characterized in that the capacitances elected for the measurement and formed between sub-electrodes (28; 56) on the first electrode support (22; 52) and sub-electrodes ("20"; 58') on one of the other opposite electrode supports (20; 52'), are of the ideal or substantially ideal plate capacitor type and/or ideal or substantially ideal cross-capacitor type, and that simultaneously any of the remaining sub-electrodes (23, 29; 53, 57, 59) on the first electrode support (22; 52) is sufficiently shielded from any of those sub-electrodes on one of the other opposite electrode supports, which together with the related sub-electrodes on the first electrode support may not constitute capacitances disturbing the measurement, whereas those sub-electrodes, for which this latter requirement cannot be realised, are coupled to the neutral point.

* * * * *